(12) United States Patent
Maede

(10) Patent No.: US 10,209,555 B2
(45) Date of Patent: Feb. 19, 2019

(54) DISPLAY DEVICE

(71) Applicant: Japan Display Inc., Minato-ku (JP)

(72) Inventor: Yuji Maede, Tokyo (JP)

(73) Assignee: Japan Display Inc., Minato-ku (JP)

( * ) Notice: Subject to any disclaimer, the term of this patent is extended or adjusted under 35 U.S.C. 154(b) by 14 days.

(21) Appl. No.: 15/628,956

(22) Filed: Jun. 21, 2017

(65) Prior Publication Data

US 2017/0371199 A1  Dec. 28, 2017

(30) Foreign Application Priority Data

Jun. 24, 2016 (JP) ................................. 2016-125733

(51) Int. Cl.
| | |
|---|---|
| *G02F 1/1335* | (2006.01) |
| *G02B 5/20* | (2006.01) |
| *G02F 1/13* | (2006.01) |
| *G09G 3/3241* | (2016.01) |
| *G02F 1/1343* | (2006.01) |
| *G02F 1/1362* | (2006.01) |

(52) U.S. Cl.
CPC ....... *G02F 1/133514* (2013.01); *G02B 5/201* (2013.01); *G02F 1/13* (2013.01); *G02F 1/1335* (2013.01); *G02F 1/133555* (2013.01); *G02F 1/134309* (2013.01); *G02F 1/136286* (2013.01); *G09G 3/3241* (2013.01); *G02F 2001/134318* (2013.01); *G02F 2201/52* (2013.01); *G09G 2300/04* (2013.01)

(58) Field of Classification Search
CPC ................................................ G02F 1/133514
See application file for complete search history.

(56) References Cited

U.S. PATENT DOCUMENTS

| | | | |
|---|---|---|---|
| 2015/0097192 A1* | 4/2015 | Araki .................... | G06F 3/0412 257/72 |
| 2015/0268797 A1* | 9/2015 | Kurasawa ............. | G06F 3/0418 345/174 |
| 2015/0301381 A1* | 10/2015 | Okita .................. | G02F 1/13338 349/12 |
| 2016/0259476 A1 | 9/2016 | Araki et al. | |
| 2017/0102600 A1 | 4/2017 | Araki et al. | |

FOREIGN PATENT DOCUMENTS

JP  2015-075605  4/2015

* cited by examiner

*Primary Examiner* — Edmond Lau
(74) *Attorney, Agent, or Firm* — Oblon, McClelland, Maier & Neustadt, L.L.P.

(57) ABSTRACT

According to one embodiment, a display device, including a first insulating, a first common electrode located on a side of the first insulating layer, a second common electrode being adjacent to the first common electrode, and a second insulating, wherein the first insulating layer is in contact with the second insulating layer at a position corresponding to the first boundary portion, the second common electrode is contact with any one of the first and second insulating layers at a position corresponding to the second boundary portion, and being in contact with both the first and second insulating layers at a position corresponding to the third boundary portion.

20 Claims, 14 Drawing Sheets

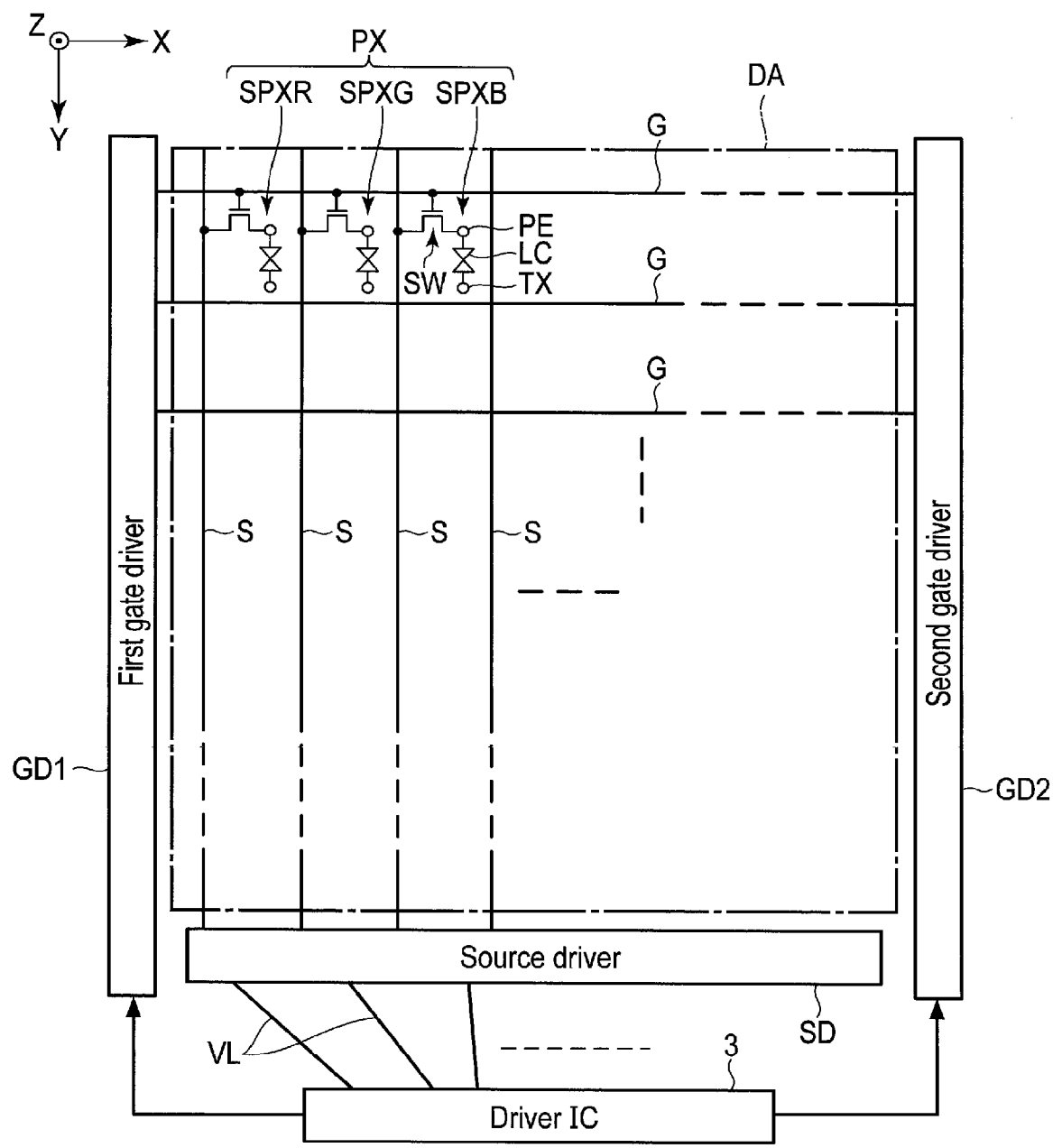
F I G. 2

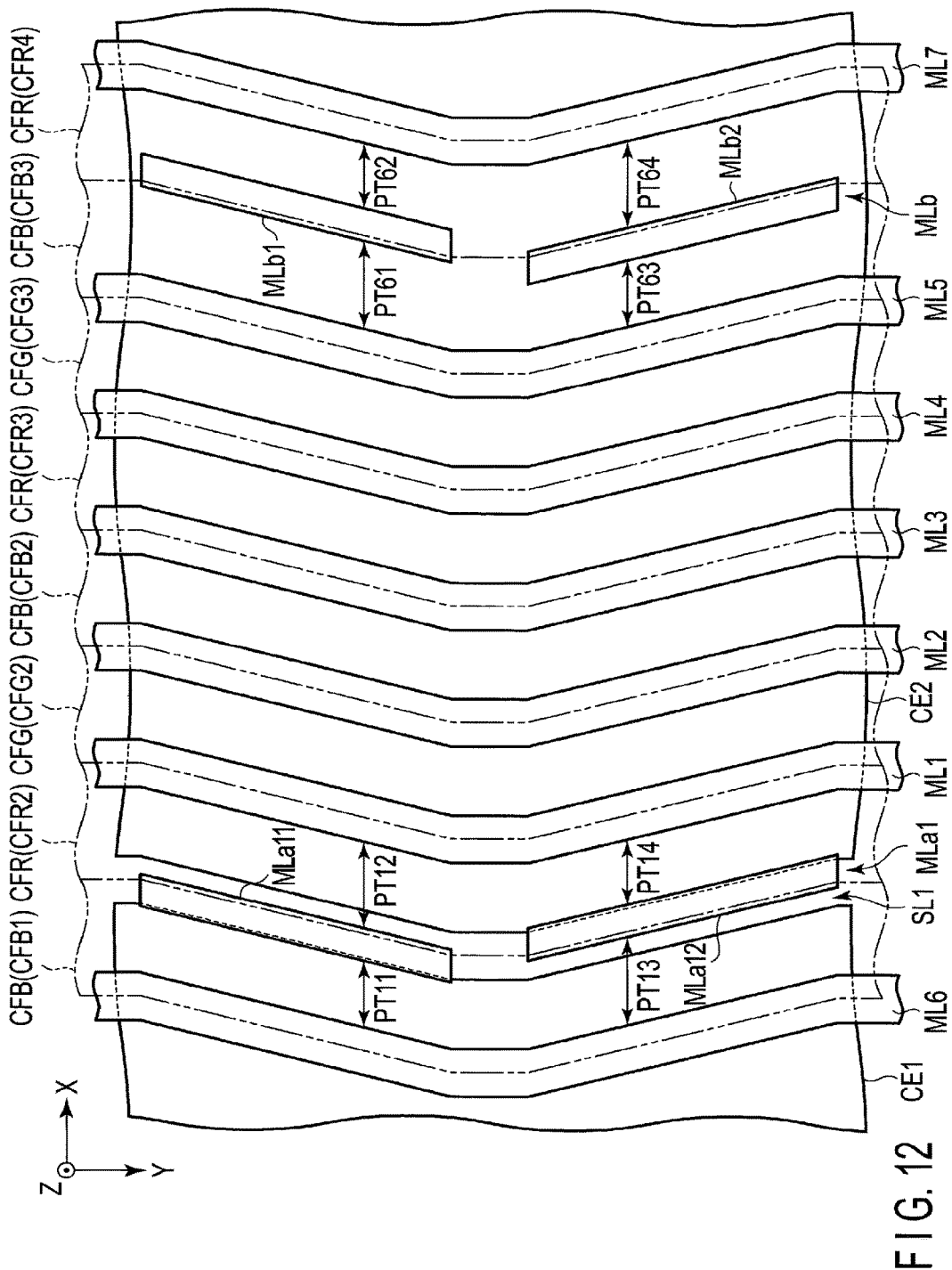
F I G. 12

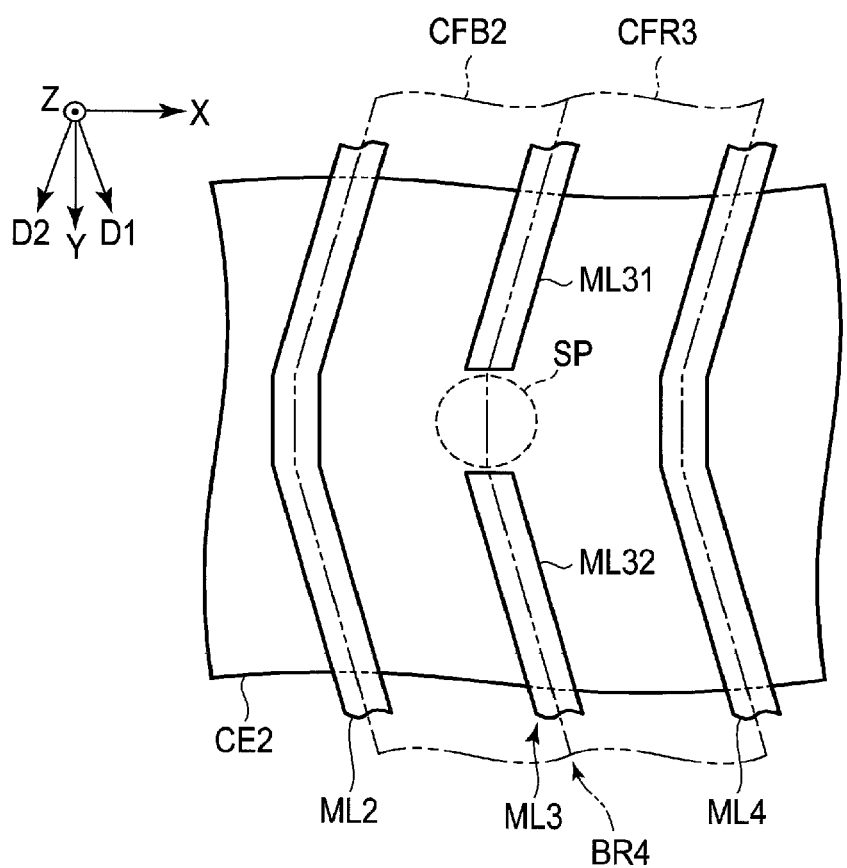
F I G. 13

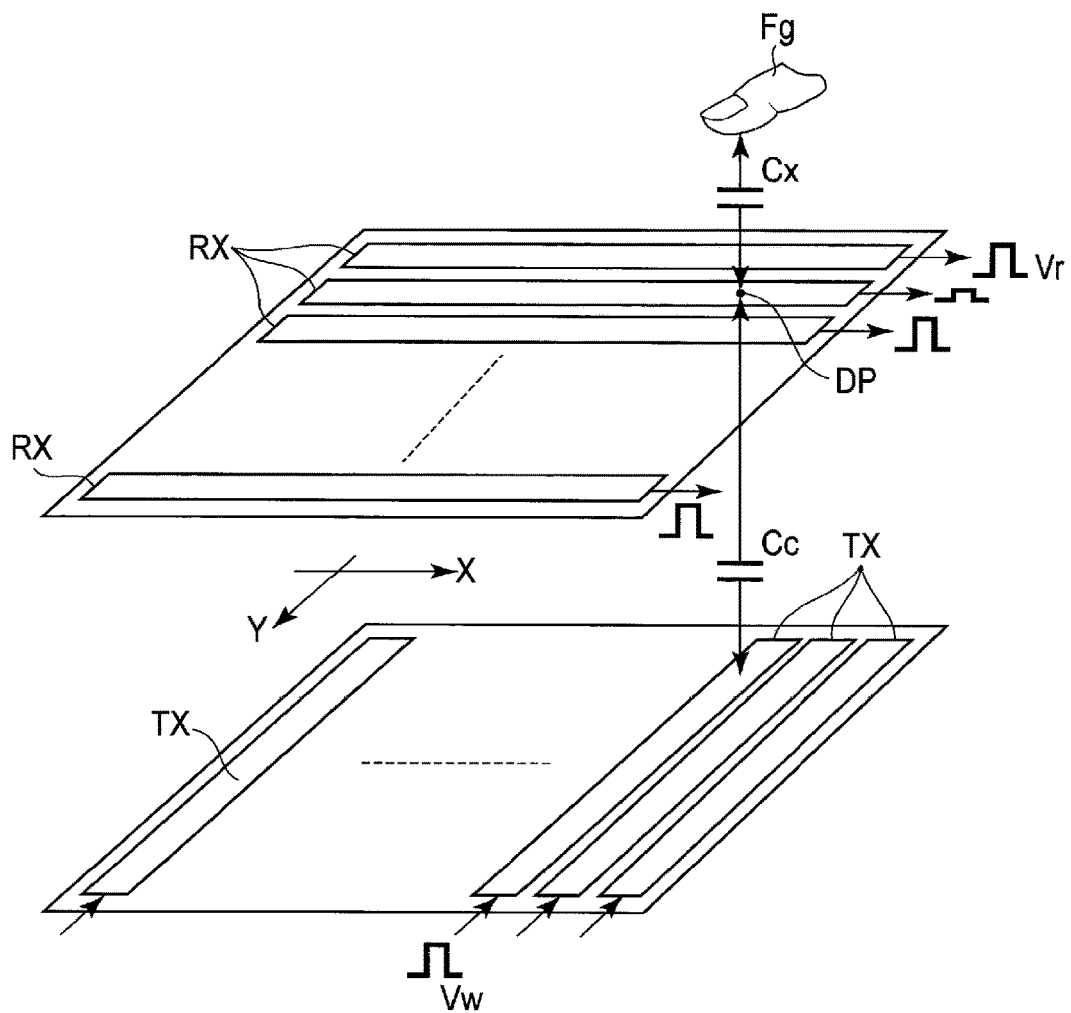
F I G. 14

DISPLAY DEVICE

CROSS-REFERENCE TO RELATED APPLICATIONS

This application is based upon and claims the benefit of priority from Japanese Patent Application No. 2016-125733, filed Jun. 24, 2016, the entire contents of which are incorporated herein by reference.

FIELD

Embodiments described herein relate generally to a display device.

BACKGROUND

A liquid crystal display device comprises, for example, a plurality of common electrodes spaced apart from each other by slits and the common electrodes are disposed across a plurality of main pixels. The slits are, for example, formed along video signal lines (source lines) which supply video signals to switching elements connected to pixel electrodes.

Incidentally, a metal line electrically connected to the common electrode has been disclosed as one of constituent elements of the liquid crystal display device. The metal lines are disposed along the video signal lines but are not disposed at the slits. At this time, the aperture ratio of the sub-pixels and the degree of color mixture may be varied and the slit cycle may be visually recognized as non-uniformity in color due to presence of the metal lines.

BRIEF DESCRIPTION OF THE DRAWINGS

FIG. 2 is a diagram showing a schematic equivalent circuit concerning image display.

FIG. 12 is a plan view for explanation of a positional relationship among the metal lines ML, MLa and MLb in a second modified example of the second configuration example.

FIG. 13 is a plan view showing an example of a positional relationship between the metal lines ML and a spacer SP.

FIG. 14 is an illustration for explanation of a principle of a mutual-capacitive sensing method.

DETAILED DESCRIPTION

Figure 1:
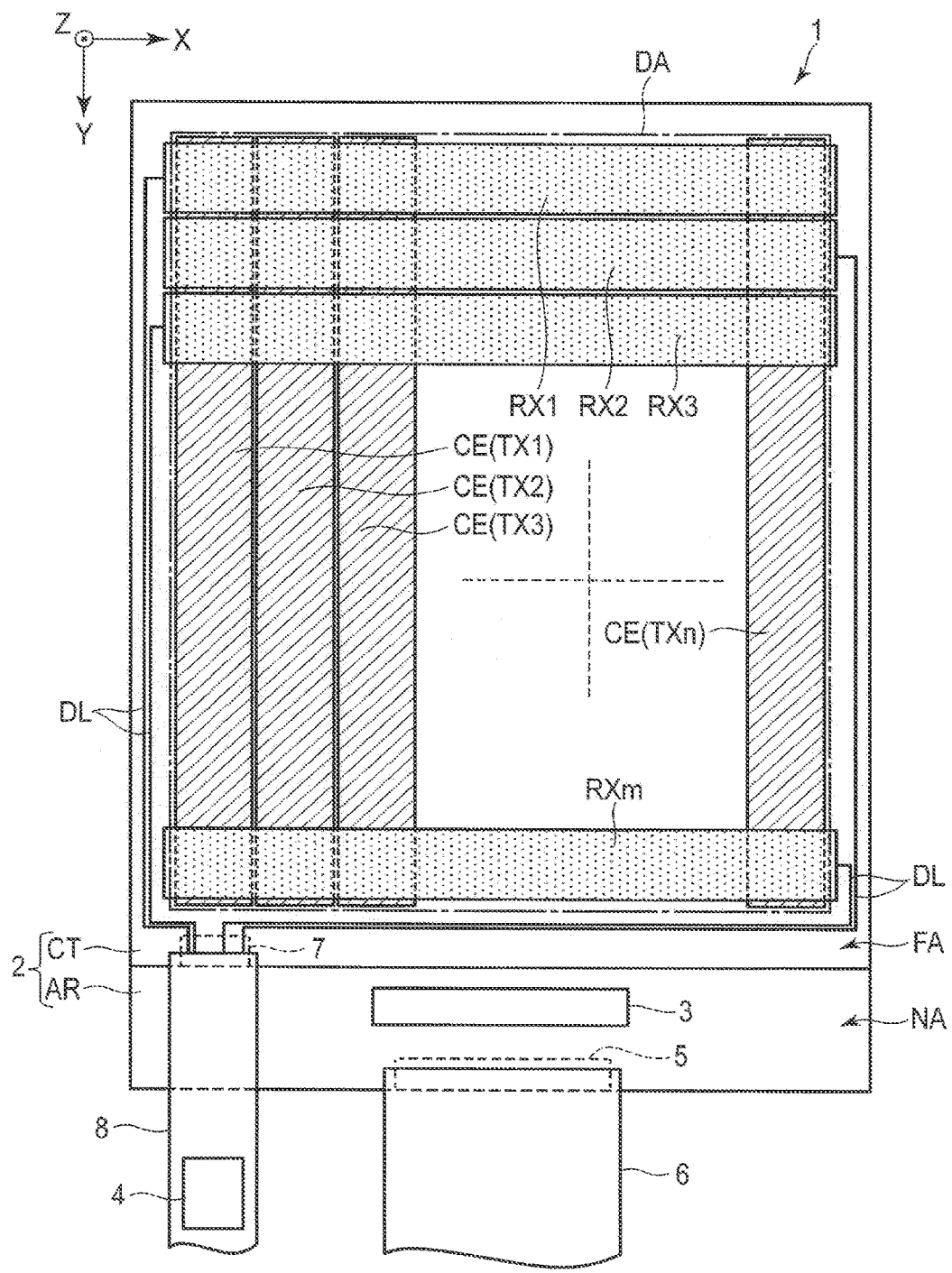
FIG. 1 is a plan view showing a schematic configuration of a display device 1 according to the embodiments.

In general, according to one embodiment, a display device, comprising: first, second, and third color filters arranged in a first direction and spaced apart from each other; a fourth color filter adjacent to the first color filter in the first direction; a fifth color filter adjacent to the second color filter in the first direction; a sixth color filter adjacent to the third color filter in the first direction; a first boundary portion between the first color filter and the fourth color filter; a second boundary portion between the second color filter and the fifth color filter; a third boundary portion between the third color filter and the sixth color filter; a first insulating layer opposed to the first to sixth color filters; a first common electrode located on a side of the first insulating layer opposed to the first color filter; a first slit extending along the first boundary portion; a second common electrode located on a side of the first insulating layer opposed to the second to sixth color filters, and being adjacent to the first common electrode via the first slit; a second insulating layer located on a side of the first to second common electrodes opposed to the first to sixth color filters; and a first metal line disposed along the second boundary portion and being in contact with the second common electrode, wherein the first insulating layer is in contact with the second insulating layer at a position corresponding to the first boundary portion, the second common electrode is in contact with any one of the first and second insulating layers at a position corresponding to the second boundary portion, and the second common electrode is in contact with both the first and second insulating layers at a position corresponding to the third boundary portion.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented, but such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

In the present embodiments, a liquid crystal display device having a touch detecting function will be described as an example of the display device. The liquid crystal display device disclosed in the embodiments is a display device of a lateral electric field type capable of displaying using an electric field parallel to a main surface of the display panel, but this display device is a mere example and may be a display device of the other type such as a longitudinal electric field type capable of displaying using an electric field in a normal of the main surface of the display panel. However, various embodiments do not prevent application of technical idea disclosed in each of the embodiments to display devices of the other types. Examples of display devices of the other types are self-luminous display devices such as organic electroluminescent display devices or electronic paper-type display devices comprising electrophoretic elements and the like.

FIG. 1 is a plan view showing a schematic configuration of a display device 1 according to the embodiments. In the figure, the first direction X, the second direction Y, and the third direction Z are orthogonal to each other but may intersect at an angle other than ninety degrees. A direction facing a tip side of an arrow indicating the third direction Z is called an upward direction, and a direction facing a side opposite to the tip of the arrow is called a downward direction. View in the X-Y plane defined by the first direction X and the second direction Y from the upward direction in the third direction Z is called a planar view.

The display device 1 can be used for, for example, various devices such as smartphones, tablet terminals, mobile telephone terminals, personal computers, TV receivers, vehicle-mounted devices, game consoles and wearable terminals.

The display device 1 comprises a display device 2, a plurality of common electrodes CE (drive electrodes TX1 to TXn), a plurality of detection electrodes RX (RX1 to RXm) opposed to the common electrodes CE, a driver IC chip 3 which functions as a driver module, and a touch detector IC chip 4 which functions as a detector module. Each of n and m is an integer of 2 or more.

The display panel 2 includes a rectangular array substrate AR (first substrate), and a counter-substrate CT (second substrate) formed in a rectangular shape with an outer shape smaller than the array substrate AR and disposed to be opposed to the array substrate AR. In the example illustrated in FIG. 1, the array substrate AR and the counter-substrate CT are overlaid and stuck on three sides. The array substrate AR includes a terminal area NA which is not opposed to the counter-substrate CT.

In the area in which the array substrate AR and the counter-substrate CT are opposed, the display panel 2 includes a display area DA in which an image is displayed, and a peripheral area FA located between the display area DA and an edge portion of the counter-substrate CT. In the example illustrated in FIG. 1, the display area DA has a rectangular shape having shorter sides in the first direction X and longer sides in the second direction Y. In addition, the peripheral area FA has a frame shape surrounding the display area DA. In the embodiment, the first direction X and the second direction Y are perpendicular to each other but may intersect at the other angle.

The common electrodes CE (sensor driving electrodes TX) extend in the second direction and are arranged in the first direction X, in the display area DA. Each common electrode CE corresponds to an electrode common to the pixels if recognized as a constituent element of the display device or corresponds to a sensor driving electrode if recognized as a constituent element of the sensor device. The common electrode CE can be formed of, for example, a transparent conductive material such as indium tin oxide (ITO) or indium zinc oxide (IZO). The common electrodes CE are formed on the array substrate AR if, for example, the display panel 2 is a display panel of the lateral electric field type. The common electrodes CE may be formed on the counter-substrate CT.

The detection electrodes RX extend in the first direction X and are arranged in the second direction Y, in the display area DA. In other words, the common electrodes CE (sensor driving electrodes TX) and the detection electrodes RX intersect each other in planar view. The detection electrodes RX can be formed of metal lines or a transparent conductive material such as ITO or IZO. The detection electrodes RX are formed on, for example, an outer surface (i.e., a surface on a side opposite to the surface opposed to the array substrate AR) of the counter-substrate CT.

The driver IC chip 3 executes control on the image display and is mounted in, for example, the terminal area NA. A first flexible printed circuit 6 which supplies image data to the display panel 2 is connected to a mount terminal 5.

A mount terminal 7 is formed at an edge portion of the counter-substrate CT along the terminal area NA. A second flexible printed circuit 8 which outputs detection signals from the detection electrodes RX is connected to the mount terminal 7. In the example shown in FIG. 1, the touch detector IC chip 4 is mounted on the second flexible printed circuit 8. Each of the detection electrodes RX is, for example, connected to the mount terminal 7 via a detection line DL formed on the surface of the counter-substrate CT in the peripheral area FA.

Next, an image displaying method in the display device 1 will be explained.

FIG. 2 is a diagram showing a schematic equivalent circuit concerning the image display.

The display device 1 comprises a plurality of signal lines composed of a plurality of scanning signal lines (gate lines) G and a plurality of video signal lines (source lines) S intersecting the signal lines. In addition, the display device 1 comprises a first gate driver GD1, a second gate driver GD2, and a source driver SD. The source driver SD is connected with the driver IC chip 3 via a plurality of video lines VL.

Scanning signal lines G extend in the first direction X and are arranged in the second direction Y, in the display area DA. Video signal lines S extend in the second direction Y and are arranged in the first direction X, in the display area DA. Each of the video signal lines S may extend linearly or extend while bent. Each of the scanning signal lines G may also extend linearly or extend while bent.

The scanning signal lines G and the video signal lines S are formed on the array substrate AR. Each of the scanning signal lines G is connected to the first gate driver GD1 and the second gate driver GD2. Each of the video signal lines S is connected to the source driver SD.

In the example shown in FIG. 2, an area sectioned by two adjacent scanning signal lines G and two adjacent video signal lines S corresponds to one sub-pixel SPX. In the present configuration example, for example, one main pixel PX is composed of a sub-pixel SPXR corresponding to a red color, a sub-pixel SPXG corresponding to a green color, and a sub-pixel SPXB corresponding to a blue color. The main pixel PX corresponds to a minimum unit of the image displayed in the display area DA. The main pixel PX may further comprise sub-pixels corresponding to a white color and a yellow color. The number of sub-pixels SPX constituting the main pixel PX is, for example, three but may be two or less or four or more. The sub-pixel SPX is often simply called a pixel in the present disclosure.

Each of the sub-pixels SPX comprises a switching element SW formed on the array substrate AR. The switching element SW is, for example, a thin-film transistor. Each switching element SW is electrically connected with the scanning signal lines G, the video signal line S, and the pixel electrode PE. At the image display, a common voltage (Vcom) is applied to the common voltage CE.

The first gate driver GD1 and the second gate driver GD2 sequentially supply scanning signals to each of the scanning signal lines G. The source driver SD is controlled by the driver IC chip 3 to selectively supply the video signal to each of the video signal line S. If the scanning signal is supplied to the scanning signal line G connected to a certain switching element SW and the video signal is supplied to the video signal line S connected to this switching element SW, a voltage corresponding to this video signal is applied to the pixel electrode PE. At this time, alignment of liquid crystal molecules of the liquid crystal layer LC sealed between the array substrate AR and the counter-substrate CT is changed from an initial alignment state in which the voltage is not applied, by the electric field generated between the pixel electrode PE and the common electrode CE. An image is displayed in the display area DA by this operation.

The common electrode CE functions as an electrode for image display and also functions as a drive electrode to detect an object (conductive material) such as a user's finger approaching the display area DA. The driver IC chip 3 sequentially supplies the drive signals to the common electrodes CE at the detection. Each detection electrode RX makes capacitive coupling with the common electrode CE, and the detection signal according to the drive signal supplied to the common electrode CE is output from the detection electrode RX. The detection signal from the detection electrode RX which the object does not approach is different in wavelength from the detection signal from the detection electrode RX which the object approaches. The touch detector IC chip 4 can detect the presence of the object approaching the display area DA and the position of the object in the first direction X and the second direction Y, based on the detection signals.

The detection method explained here is a mere example, and the other detection methods can also be employed. For example, a method of detecting an object approaching the display area DA with the capacitance (self-capacitance) which the detection electrode RX or the common electrode CE has by itself can also be employed. The method of detecting the object in the present configuration example will be explained later.

The colors of the above-explained sub-pixels SPX are determined by the color filter layer CF of the display panel 2. Next, an example of a layout of the color filter layer CF will be explained. In the figure, a direction intersecting the second direction Y counterclockwise at an acute angle is defined as direction D1, and a direction intersecting the second direction Y clockwise at an acute angle is defined as direction D2. An angle $\theta 1$ made between the second direction Y and the direction D1 is approximately equal to an angle $\theta 2$ made between the second direction Y and the direction D2, in the example illustrated, but may be different from the angle $\theta 2$.

Figure 3:
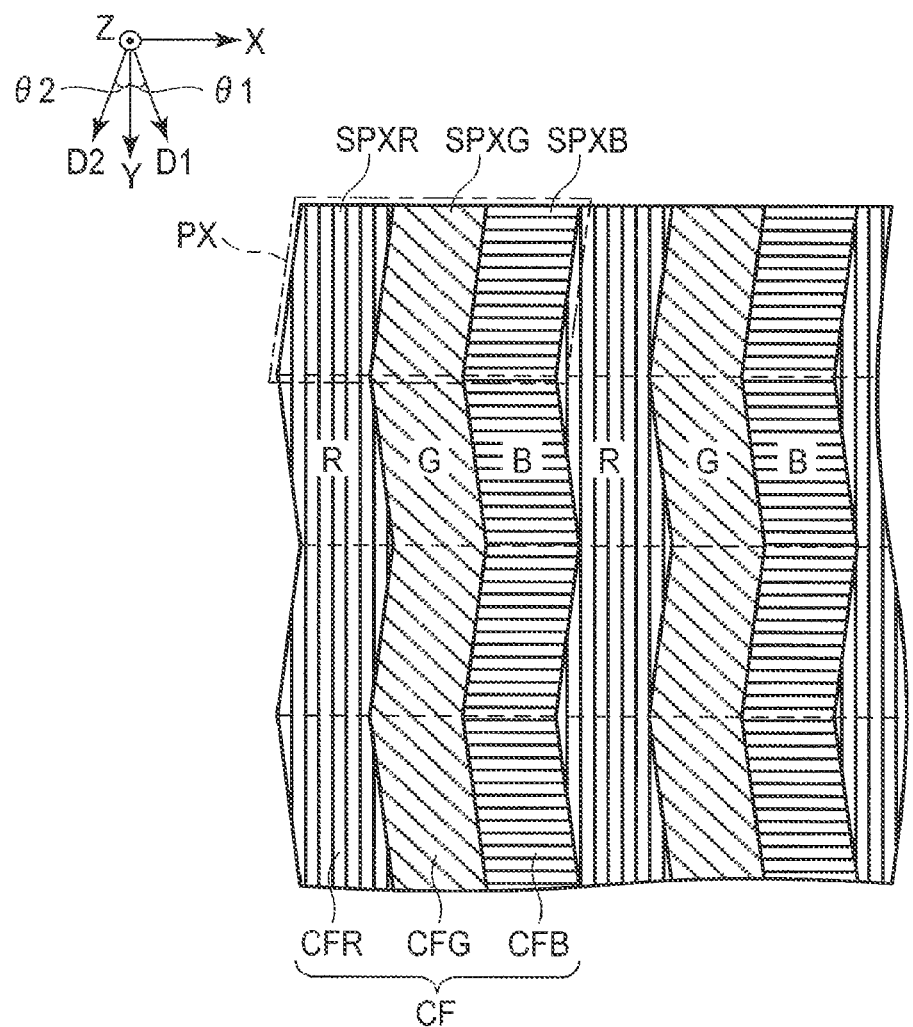
FIG. 3 is a plan view schematically showing a relationship between a color filter layer CF and sub-pixels SPX.

FIG. 3 is a plan view schematically showing a relationship between the color filter layer CF and sub-pixels SPX.

In the explanation of the present configuration example, the planar view indicates observation of the X-Y plane defined by the first direction X and the second direction Y from the normal.

In the present configuration example, the sub-pixels SPXR, SPXG, and SPXB are sequentially disposed in the second direction Y.

The color filter CF includes a color filter CFR, a color filter CFG, and a color filter CFB. The color filters CFR, CFG, and CFB are formed of resin materials colored in red (first color), green (second color), and blue (third color), respectively. For example, the color filter CFR is formed in a strip shape and overlaid on a plurality of sub-pixels SPXR arranged in the second direction Y in planar view. In addition, the color filters CFG and CFB are formed in a strip shape and overlaid on a plurality of sub-pixels SPXG and a plurality of sub-pixels SPXB arranged in the second direction Y in planar view, respectively. In the example illustrated, the color filters CFR, CFG, and CFB extend in the directions D1 and D2, alternately, and are sequentially disposed in a zigzag state in the second direction Y. The color filters CFR, CFG, and CFB may be formed for the sub-pixels SPXR, SPXG, and SPXB, respectively.

The layout of the sub-pixels SPX is not limited to the layout shown in FIG. 3. For example, the layouts of the sub-pixels SPX in adjacent main pixels PX may be changed such that at least one of the sub-pixels SPXR, SPXG, and SPXB is discontinuous in the second direction Y. Alternatively, one main pixel PX may include a plurality of the sub-pixels of the same type as least one of the sub-pixels SPXR, SPXG, and SPXB or include the above-explained white or yellow sub-pixel SPX.

Next, a structure of the sub-pixel SPX will be explained.

Figure 4:
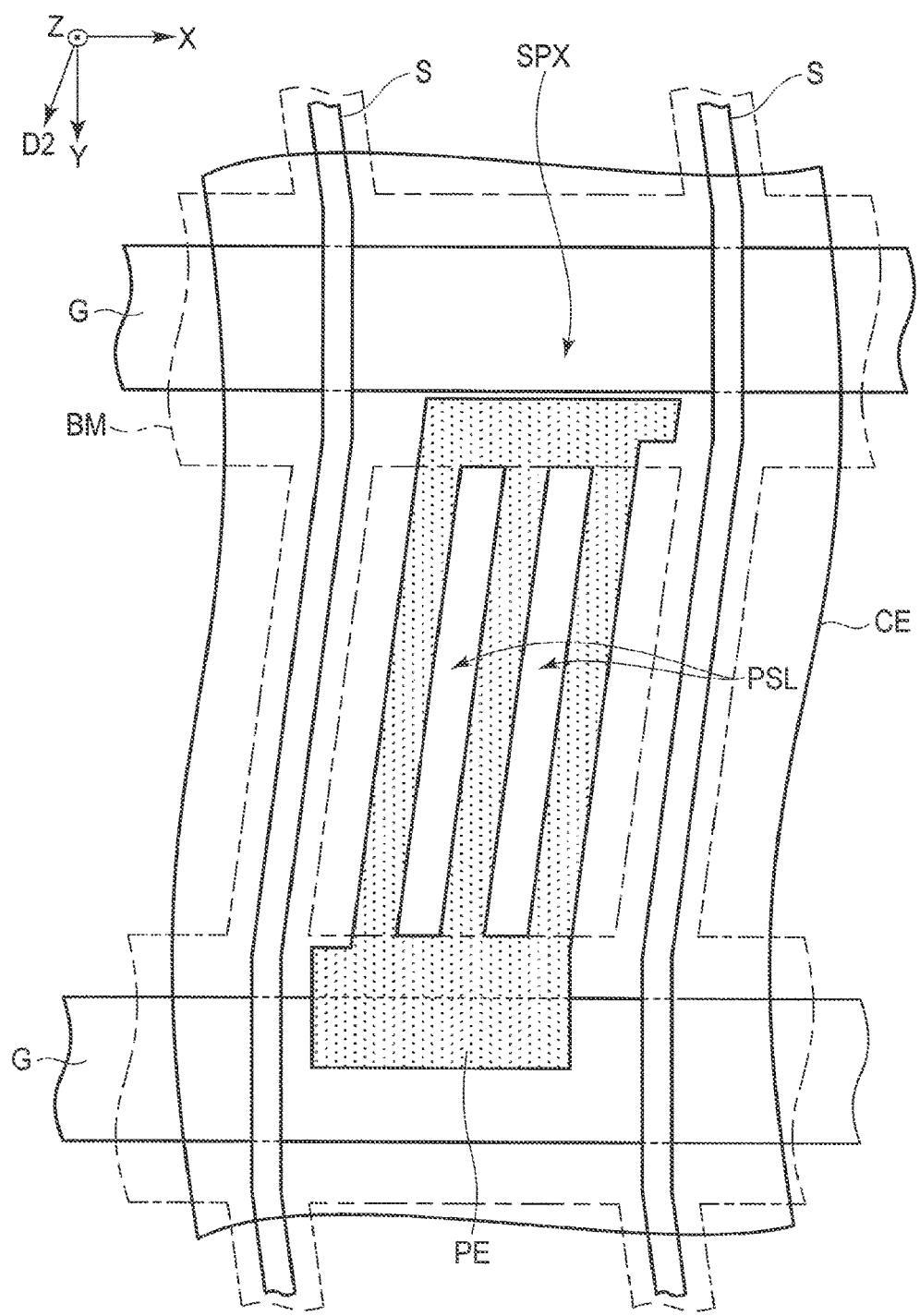
FIG. 4 is a plan view schematically showing an example of a structure applicable to the sub-pixel SPX.

FIG. 4 is a plan view schematically showing an example of a structure applicable to the sub-pixel SPX.

The sub-pixel SPX is a pixel sectioned by two adjacent scanning signal lines G and two adjacent video signal lines S. In the example shown in the figure, the video signal lines S extend in the direction D2 between two adjacent scanning signal lines G.

The pixel electrode PE including two slits PSL elongated in the direction D2 is disposed in the sub-pixel SPX. The pixel electrode PE is also elongated in the direction D2. The longitudinal direction of the pixel electrode PE and the slits PSL is parallel to the direction of extension of the video signal lines S which section the sub-pixel SPX, and the longitudinal direction is not limited to the direction D2 but may be the direction D1. The common electrode CE opposed to the pixel electrode PE is disposed in the sub-pixel SPX. The common electrode CE is disposed across a plurality of sub-pixels SPX adjacent in the first direction X and the second direction Y. The pixel electrode PE and the common electrode CE are formed of, for example, a transparent conductive material such as ITO or IZO. The shape of the pixel electrode PE is not limited to the shape illustrated, but may be a shape including more slits PSL or a shape including only one slit PSL. Alternatively, the pixel electrode PE may not include the slits PSL. If the number of slits PSL is increased, the luminance of the sub-pixel SPX can be increased. According to the embodiments, the number of slits PSL can be increased and the luminance of the sub-pixels SPX can be improved since the degradation in display quality such as non-uniformity in color which becomes conspicuous when the luminance of the sub-pixels SPX is increased can be suppressed.

The scanning signal lines G, the video signal lines S, the pixel electrode PE, the common electrode CE, and the metal lines ML are disposed on the array substrate AR. In contrast, a light-shielding layer (black matrix) BM is disposed on the counter-substrate CT. In FIG. 4, an outline of the light-shielding layer BM is represented by a one-dot-chained line. The light-shielding layer BM is overlaid on the scanning signal lines G and the video signal lines S, also overlaid on the metal lines ML which will be explained later, and opened inside the sub-pixel SPX. The light-shielding layer BM is overlaid on several parts of the pixel electrode PE and constituent electrodes SE and also on the switching element SW shown in FIG. 2.

Next, a detailed arrangement example of the scanning signal lines G, the video signal lines S, the common electrodes CE, and the metal lines ML will be explained.

Figure 5:
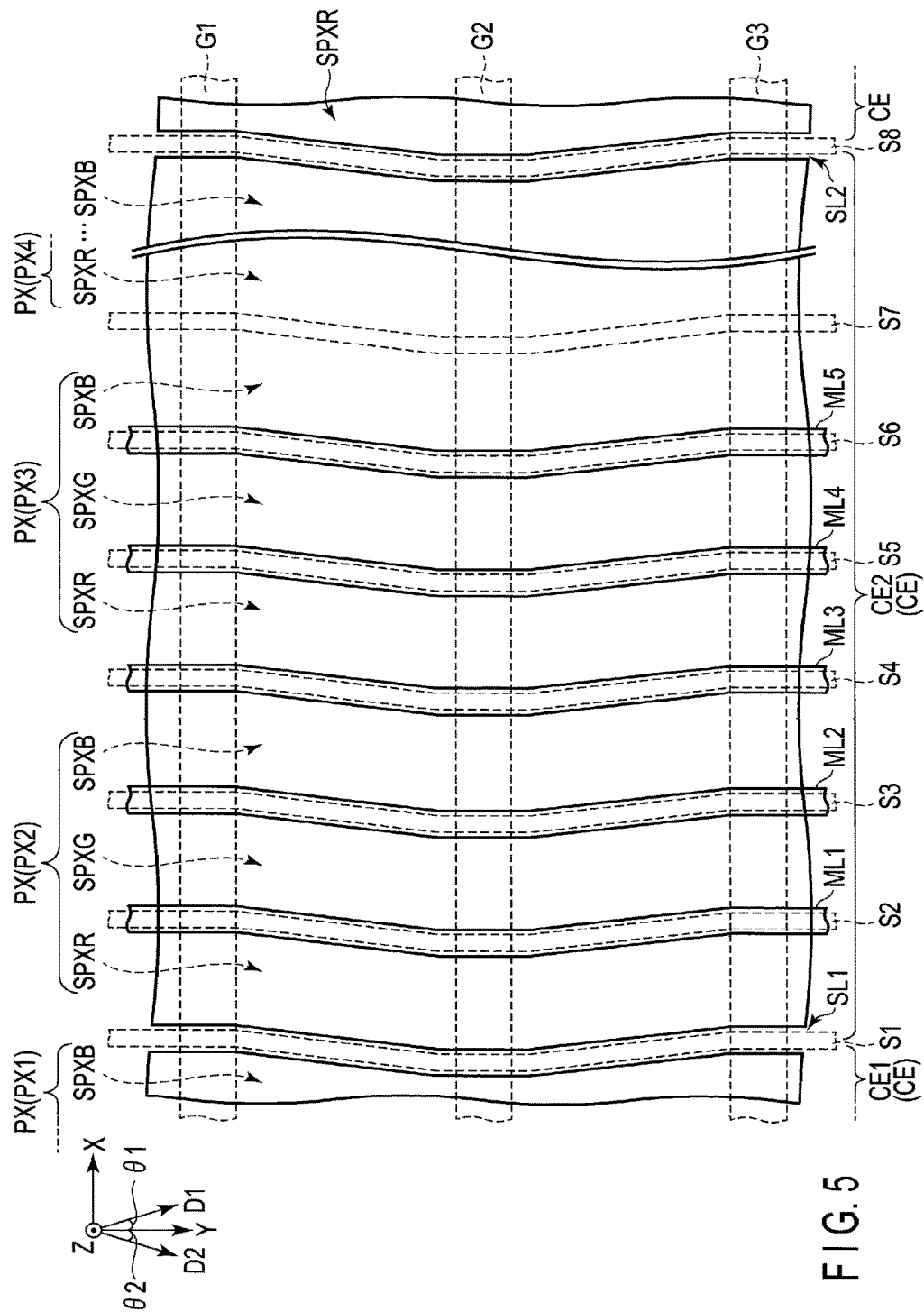
FIG. 5 is a plan view schematically showing a layout of metal lines ML and common electrodes CE in a first configuration example.

FIG. 5 is a plan view schematically showing a layout of the metal lines ML and the common electrodes CE in the first configuration example.

The display area DA is enlarged in this figure, and eight video signal lines S (S1 to S8) and three scanning signal lines G (G1 to G3) are represented by dotted lines. In addition, a plurality of common electrodes CE (CE1, CE2, and the like) and five metal lines ML (ML1 to ML5) spaced apart in the first direction X by the slits SL (SL1 and SL2) are represented by solid lines.

The scanning signal lines G1 to G3 extend in the first direction X, and are arranged in the second direction Y and spaced apart from each other. The video signal lines S1 to S8 are arranged in the first direction X and spaced apart from each other. The other video signal line S is arranged between the video signal lines S7 and S8, which is not illustrated in the figure. In addition, the video signal lines S1 to S8 extend in the direction D2 between the scanning signal lines G1 and G2 and extend in the direction D1 between the scanning signal lines G2 and G3. In other words, the video signal lines S1 to S8 extend in the directions D1 and D2, alternately, and are disposed in a zigzag state in the second direction Y.

The scanning signal lines G and the video signal lines S intersect in planar view. The switching elements SW (not shown) are formed at intersections of the scanning signal lines G and the video signal line S, and controlled by the scanning signal lines G. Each of the sub-pixels SPX between the scanning signal lines G1 and G2 is, for example, a pixel comprising the switching element SW controlled by the scanning signal line G2. Each of the sub-pixels SPX between the scanning signal lines G2 and G3 is, for example, a pixel comprising the switching element SW controlled by the scanning signal line G3.

The main pixels PX1, PX2, and PX3 are arranged in the first direction X between the scanning signal lines G1 and G2. The main pixel PX2 is composed of the sub-pixel SPXR between the video signal lines S1 and S2, the sub-pixel SPXG between the video signal lines S2 and S3, and the sub-pixel SPXB between the video signal lines S3 and S5. In other words, the main pixel PX2 corresponds to an area sectioned by the scanning signal lines G1 and G2, and the video signal lines S1 and S4. The main pixel PX1 is adjacent to the main pixel PX2 via the video signal line S1 (slit SL1 to be explained later). The main pixel PX3 is adjacent to the main pixel PX2 via the video signal line S4 (metal line PX2 to be explained later). In other words, the main pixel PX3 corresponds to an area sectioned by the scanning signal lines G1 and G2, and the video signal lines S4 and S7. The main pixel PX4 is adjacent to the main pixel PX3 via the video signal line S7.

The common electrode CE1 is opposed to the scanning signal lines G1 to G3 and, for example, spaced apart from the video signal line S1 in planar view. The common electrode CE2 is opposed to the scanning signal lines G1 to G3 and the video signal lines S2 to S7 and, for example, spaced apart from the video signal line S1 in planar view. The common electrodes CE1 and CE2 are adjacent to the slit SL1 along the video signal line S1 and adjacent to each other via the slit SL1. The common electrodes CE1 and CE2 may be partially opposed to the video signal line S1.

The common electrode CE2 is adjacent to the slit SL2 along the video signal line S8, on a side opposite to the slit SL1. The common electrode CE2 is adjacent to the other common electrode CE via the slit SL2. The common electrode CE2 is spaced apart from, for example, the video signal line S8 in planar view but may be partially opposed to the video signal line S8. For example, an interval in the first direction X between the slits SL1 and SL2 is an integer multiple of an interval in the first direction X between the video signal lines S1 and S7, i.e., two adjacent video signal lines of the video signal lines S which are not opposed to the metal lines ML. In other words, the interval between the slits SL1 and SL2 is an integer multiple of the interval between the boundary portions BR1 and BR7.

The metal lines ML are formed in a layer different from the layer in which the scanning signal lines G are formed or the layer in which the video signal lines S are formed. The metal lines ML1 to ML5 are opposed to and in contact with the common electrode CE. The metal line ML1 is disposed along the video signal line S2 and completely superposed on the video signal lines S1 and S2 in planar view. The metal lines ML2 to ML5 are disposed along the video signal lines S3 to S6, respectively, and completely superposed on the video signal lines S3 to S6 in planar view. However, the metal lines ML1 to ML5 may be partially superposed on the video signal lines S2 to S6 in planar view. For example, the metal lines ML1 to ML5 may be superposed on one-end sides of the video signal lines S2 to S6 and may not superposed on the other end sides.

In the example illustrated, the metal lines ML are not disposed along the video signal lines S1, S7, and S8. In other words, the metal line ML is not disposed at the position opposed to the slit SL1, between the main pixels PX1 and PX2. The metal line ML is disposed at the position opposed to the common electrode CE2, between the main pixels PX2 and PX3. The metal line ML is not disposed at the position opposed to the common electrode CE2, between the main pixels PX3 and PX4. In other words, the metal line ML is disposed between several main pixels PX but the metal line ML is not disposed between several main pixels PX, in the area opposed to the common electrode CE.

In the example illustrated, two main pixels PX are formed and five metal lines ML and five video signal lines S are disposed, between two video signal lines S that are not opposed to the metal lines ML. However, three or more main pixels PX may be formed and 3k−1 (k is an integer of three or more) metal lines ML (video signal lines S) may be disposed, between two video signal lines S that are not opposed to the metal lines ML.

The metal lines ML can be formed of, for example, metal materials such as molybdenum, tungsten, aluminum, titanium and copper or alloys containing these metal materials. The metal lines ML may be in a single-layer structure or a multi-layer structure formed by depositing layers of different materials. The metal lines ML desirably contain a black metal material having a light absorbing property from the viewpoint of suppressing glittering caused by light reflection.

The slit SL1 may be a dummy slit or a general slit. If the slit SL1 is a general slit, the common electrodes CE1 and CE2 are electrically connected to different detection lines DL, respectively, in the peripheral area FA. If the slit SL1 is a dummy slit, the common electrodes CE1 and CE2 are electrically connected to each other and electrically connected to the same detection line DL, in the peripheral area FA.

Next, a sectional structure of the display panel 2 will be explained. A structure of the display pane 2 will be explained below, with a cross-section obtained by cutting the display panel 2 in the first direction X.

Figure 6:
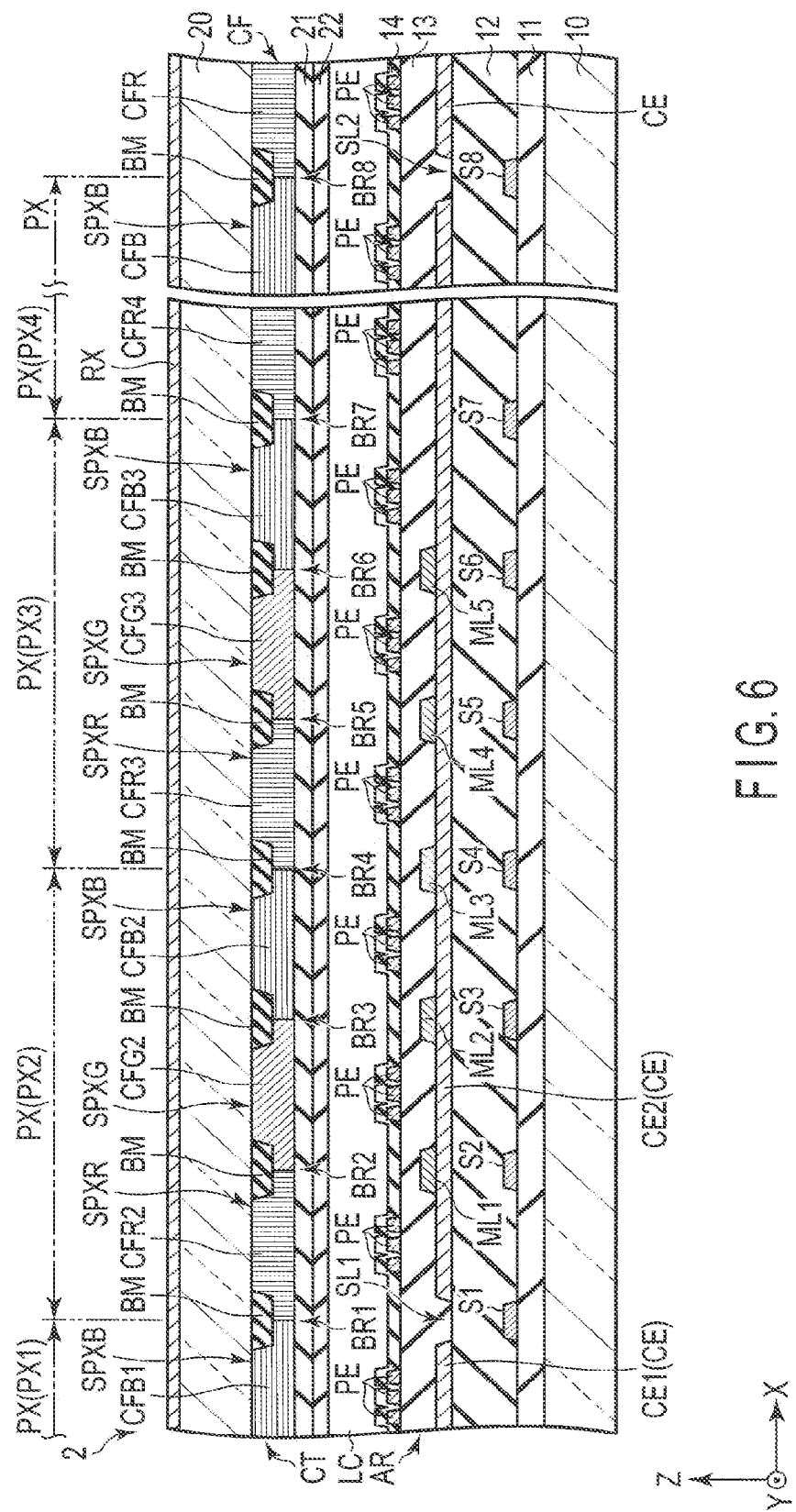
FIG. 6 is a cross-sectional view schematically showing a display panel 2 in the first configuration example.

FIG. 6 is a cross-sectional view schematically showing the display panel 2 in the first configuration example.

In the example illustrated, the color filter layer CF includes a color filter CFB1 disposed on the main pixel PX1, color filters CFR2, CFG2, and CFB2 disposed on the main pixel PX2, color filters CFR3, CFG3, and CFB3 disposed on the main pixel PX3, and a color filter CFR4 disposed on the main pixel PX4. The color filters CFR2, CFR2, and CFR4 correspond to the color filter CFR shown in FIG. 3, the color filters CFG2 and CFG3 correspond to the color filter CFG shown in FIG. 3, and the color filters CFB1, CFB2, and CFB3 correspond to the color filter CFS shown in FIG. 3.

The array substrate AR includes a first insulating substrate 10 formed of a glass substrate and the like. A first insulating layer 11 is formed on a side opposed to a counter-substrate CT of the first insulating substrate 10, and the video signal lines S are formed on a side opposed to the counter-substrate CT of the first insulating layer 11. The first insulating layer 11 and the video signal lines S are covered with a second insulating layer 12.

The common electrodes CE1 and CE2 are formed on a side opposed to the counter-substrate CT of the second insulating layer 12. The common electrode CE1 is located on a side opposed to the color filter CFB1 of the second insulating layer 12. The common electrode CE2 is located on a side opposed to the color filters CFR2 to CFR4, CFG2, CFG3, CFB2 and CFB3 of the second insulating layer 12.

The metal lines ML1 to ML5 are formed on a side opposed to the counter-electrode CT of the common electrode CE2. In other words, the metal lines ML1 to ML5 are formed on an upper side of the common electrode CE2 in the third direction Z. A third insulating layer 13 is formed on a side (upper side) opposed to the counter-substrate CT of the common electrodes CE1 and CE2 to cover the metal lines ML1 to ML5 and the common electrodes CE1 and CE2. The pixel electrodes PE are formed on a side (upper side) opposed to the counter-substrate CT of the third insulating layer 13. The first alignment film 14 is formed on a side opposed to the counter-substrate CT of the pixel electrodes PE to cover the pixel electrodes PE and the third insulating layer 13.

The counter-substrate CT includes a second insulating substrate 20 formed of a glass substrate and the like. The light-shielding layer BM and the color filter layer CF (color filters CFR, CFG, and CFB) are formed on a side opposed to the array substrate AR of the second insulating substrate 20. In other words, the light-shielding layer BM and the color filter CF are formed on the lower side of the second basement 20 in the third direction Z. Boundary portions BR (BR1 to BR8) of the color filters CFR, CFG, and CFB are opposed to the light-shielding layer BM. In the example illustrated, the boundary portions BR are located directly under the light-shielding layer BM.

At the boundary portion BR1 (first boundary portion), the color filters CFB1 and CFR2 are adjacent to each other and the main pixels PX1 and PX2 are adjacent to each other. The color filters CFR2 and CFG2 disposed in the main pixel PX2 are adjacent to each other at the boundary portion BR2, and the color filters CFG2 and CFB2 disposed in the main pixel PX2 are adjacent to each other at the boundary portion BR3. At the boundary portion BR4 (second boundary portion), the color filters CFB2 and CFR3 are adjacent to each other and the main pixels PX2 and PX3 are adjacent to each other. The color filters CFR3 and CFG3 disposed in the main pixel PX3 are adjacent to each other at the boundary portion BR5, and the color filters CFG3 and CFB3 disposed in the main pixel PX3 are adjacent to each other at the boundary portion BR6. At the boundary portion BR7 (third boundary portion), the color filters CFB3 and CFR4 are adjacent to each other and the main pixels PX3 and PX4 are adjacent to each other. At the boundary portion BR8, the color filters CFB and CFR are adjacent to each other and the main pixels PX are adjacent to each other.

The color filter layer CF is covered with a planarizing layer 21, and the planarizing layer 21 is covered with the second alignment film 22. The detection electrode RX is formed on the outer surface (i.e., the side opposite to the side opposed to the array substrate AR) of the second insulating substrate 20. The position of the detection electrode RX is not limited to this, but the detection electrode RX may be formed on the side of the second insulating substrate 20 which is opposed to the array substrate AR. The liquid crystal layer LC is sealed between the first alignment film 14 and the second alignment film 22.

The video signal lines S1 to S8 are arranged along the boundary portions BR1 to BR8, respectively, in planar view and opposed to the boundary portions BR1 to BR8, respectively, in the example illustrated. The slit SL1 is located along the boundary portion BR1 in planar view and opposed to the boundary portion BR1 in the example illustrated. Similarly, the slit SL2 is located along the boundary portion BR8 in planar view and opposed to the boundary portion BR8 in the example illustrated. The metal lines ML1 to ML6 are arranged along the boundary portions BR2 to BR7, respectively, in planar view and opposed to the boundary portions BR2 to BR7, respectively, in the example illustrated.

At the positions corresponding to the boundary portions BR1 and BR8, the second insulating layer 12 is in contact with the third insulating layer 13. In the example illustrated, the second insulating layer 12 is entirely covered with the third insulating layer 13, inside the slits SL1 and SL2. At the positions corresponding to the boundary portions BR2 to BR6, the common electrode CE2 is in contact with at least one of the second insulating layer 12 and the third insulating layer 13 and is also in contact with the metal lines ML1 to ML5. In the example illustrated, the common electrode CE2 is in contact with the second insulating layer 12 and is also in contact with the metal lines ML1 to ML5. At the position corresponding to the boundary portion BR7, the common electrode CE2 is in contact with both the second insulating layer 12 and the third insulating layer 13. Thus, the transmission rate of the common voltage Vcom and the sensor drive signal Vw can be made higher and the display quality and the detection capability can be improved by electrically connecting the metal lines ML1 to ML5 to the common electrode CE2.

The metal lines ML may be disposed between the second insulating layer 12 and the common electrode CE. In this case, too, the common electrode CE and the metal lines ML can be electrically connected with each other. In addition, in this case, the common electrode is in contact with the metal lines ML and the third insulating layer 13 at the position corresponding to the boundary portion BR.

In the example illustrated, the metal lines ML are disposed at all the positions corresponding to the boundary portions BR between the color filter CFG and the other color filters, and the metal lines ML are not disposed at several positions of the positions corresponding to the boundary portions BR between the color filters CFB and CFR. The boundary portion BR at the position at which the metal lines ML are not disposed is not limited to the boundary portion between the blue color filter and the red color filter, but may be the boundary portion between the green color filter and the other color filter. Desirably, however, the metal lines ML are disposed at the positions corresponding to the boundary portions of the green color filter having the highest visibility, of red, green and blue color filters, and the metal lines ML are not disposed at several positions of the positions corresponding to the boundary portions between the red and blue color filters. According to this configuration, color mixture generated by allowing transmitted light or reflected light of a certain sub-pixel to be transmitted through the color filter of the other sub-pixel adjacent to the sub-pixel or color shift generated by the difference between the aperture ratio of the sub-pixel adjacent to the metal line ML and the aperture ratio of the sub-pixel not adjacent can be reduced, and the degradation in display quality can be suppressed.

In addition, in the example illustrated, two main pixels PX are formed between the boundary portion BR1 which is not opposed to the metal line ML but opposed to the slit SL1 and the boundary portion BR7 which is not opposed to the metal line ML but opposed to the common electrode CE2. In other words, six color filters, and five boundary portions BR opposed to the metal lines ML are located between two metal lines ML that are adjacent to each other without being opposed to the metal lines ML. However, the embodiments are not limited to this, but three or more main pixels PX may be formed between two boundary portions BR that are adjacent to each other without being opposed to the metal lines ML. In other words, 3k (k is an integer of three or more) color filters, and 3k−1 boundary portions BR opposed to the metal lines ML may be disposed between two boundary portions BR that are adjacent to each other without being opposed to the metal lines ML.

According to the configuration example, the metal line ML is not disposed at the position corresponding to the boundary portion BR1 of the color filter, the metal line ML3 is disposed at the position corresponding to the boundary portion BR4 of the color filter, and the metal line ML is not disposed at the position corresponding to the boundary portion BR7 of the color filter. In other words, the metal lines ML are disposed at several positions of the positions corresponding to the boundary portions BR between the color filters CFR and CFB while the metal lines ML are not disposed at several positions. Since the aperture ratio in the oblique direction of the sub-pixels SPX adjacent to the metal lines ML has a risk of being degraded due to the light-shielding property of the metal lines ML, the luminance in the oblique direction can be improved according to the present configuration example, as compared with the configuration in which the metal lines ML are disposed at all the positions corresponding to the boundary portions BR between the color filters CFR and CFB. In addition, change of coloring (color shift) at the main pixel PX according to the viewing angle which is caused due to the difference between the aperture ratio in the oblique direction of the sub-pixels SPX adjacent to the metal lines ML and the aperture ratio in the oblique direction of the sub-pixels SPX not adjacent to the metal lines ML can be reduced as compared with the configuration in which the metal lines ML are not disposed at all the positions corresponding to the boundary portions BR between the color filters CFR and CFB. In addition, since light transmitted between the sub-pixels SPX adjacent to the metal lines ML can be blocked as compared with the configuration in which the metal lines ML are not disposed at all the positions corresponding to the boundary portions BR between the color filters CFR and CFB, change of coloring (color mixture) at the main pixel PX which is caused by allowing the light of a certain sub-pixel SPX to be transmitted through the color filter arranged at the other sub-pixel SPX can be reduced.

Next, a first configuration example will be explained from the viewpoint of intervals and dimensions of members.

Figure 7:
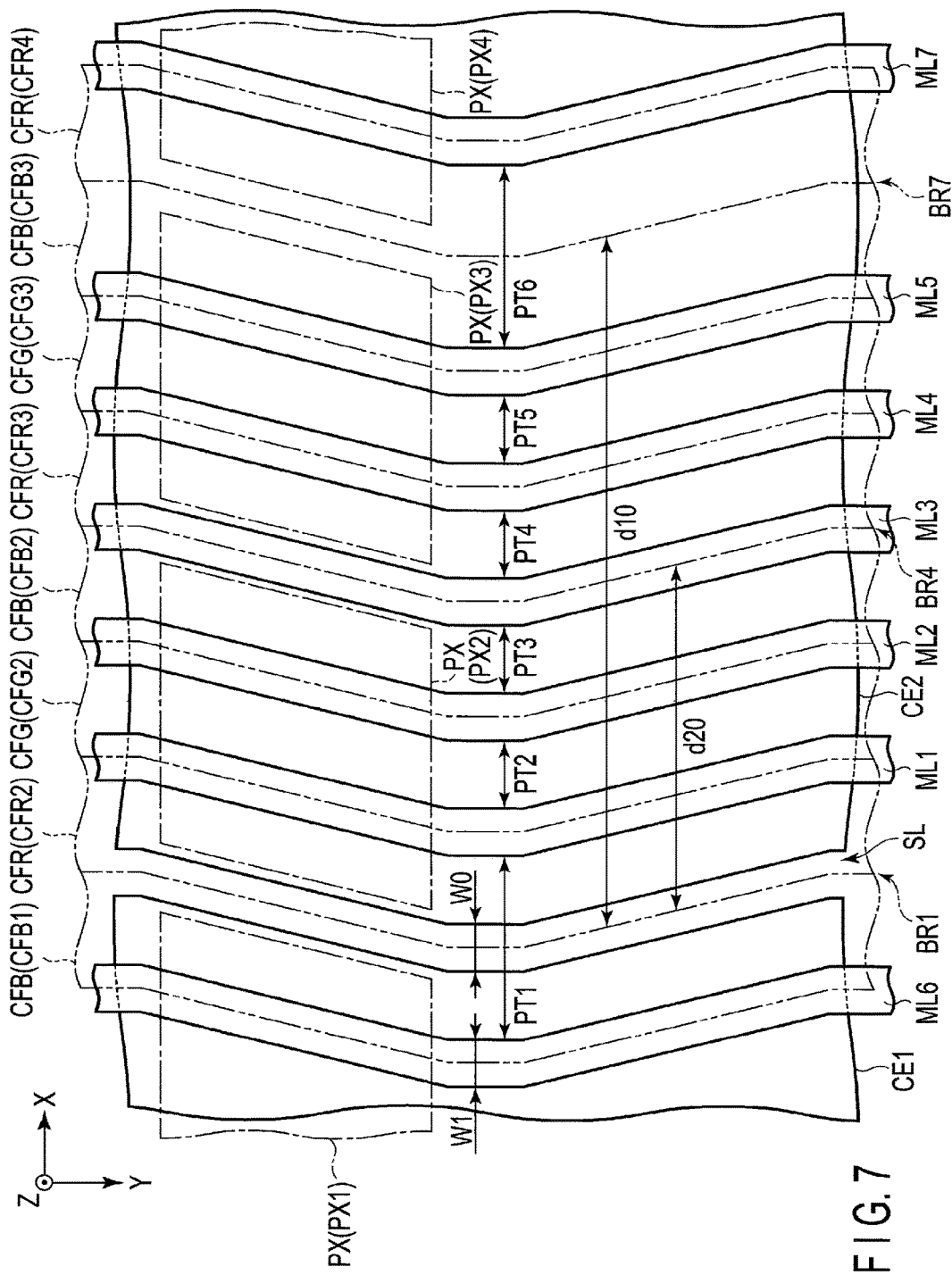
FIG. 7 is a plan view for explanation of various dimensions concerning the metal lines ML in the first configuration example.

FIG. 7 is a plan view for explanation of various dimensions concerning the metal lines ML in the first configuration example.

In this figure, a metal line ML6 disposed along the edge portion of the color filter CFB disposed in the main pixel PX1, and a metal line ML7 disposed along the edge portion of the color filter CFR disposed in the main pixel PX4 are further illustrated.

The width of each metal line ML in the first direction X is denoted by W1, and the width of the slit SL1 in the first direction X is denoted by W0. An interval between the adjacent metal lines ML6 and ML1 is denoted by PT1, an interval between the adjacent metal lines ML1 and ML2 is denoted by PT2, an interval between the adjacent metal lines ML2 and ML3 is denoted by P13, an interval between the adjacent metal lines ML3 and ML4 is denoted by PT4, an interval between the adjacent metal lines ML4 and ML5 is denoted by PT5, an interval between the adjacent metal lines ML5 and ML7 is denoted by PT6. The interval PT corresponds to a distance between edge sides on mutually opposed sides of the adjacent metal lines ML.

A distance between the boundary portions BR1 and BR7 in the first direction X is referred to as d10, and a distance between the boundary portions BR1 and BR4 in the first direction X is referred to as d20. The distance d10 corresponds to a sum of the widths of the main pixels PX2 and PX3 in the first direction X, and the distance d20 corresponds to the width of the main pixel PX2 in the first direction X. In other words, the distance d10 is double the distance d20. The distance d10 is the interval between the boundary portions BR which are not opposed to the video signal line S, and may be an integer multiple of three or more of the distance d20 if three or more main pixels PX are disposed between the boundary portions BR1 and BR7.

For example, the intervals PT2 to PT5 are equal to each other and smaller than the intervals PT1 and PT6. For example, the intervals PT1 and PT6 are equal to each other and also equal to a sum of the intervals PT3 and PT4 and the width W1. In addition, the distance d and the width W satisfy relationships $d10=0.5\times(PT1+PT6)+PT2+PT3+PT4+5\times W1$ and $d20=0.5\times PT1+PT2+PT3+2.5\times W1$.

Two sub-pixels SPX located between the metal lines ML6 and ML1 and adjacent to each other via the slit SL1 have greater color shift and color mixture than two sub-pixels SPX located between the metal lines ML2 and ML4 and adjacent to each other via the metal line ML3. Two sub-pixels SPX located between the metal lines ML5 and ML7 and adjacent to each other also have greater color shift and color mixture than two sub-pixels SPX located between the metal lines ML2 and ML4 and adjacent to each other via the metal line ML3. For this reason, the difference in hue and luminance between the main pixels PX may be visually recognized as non-uniformity in periodic stripe, in accordance with the magnitude of the distance d10 between the boundary portions BR1 and BR7. Thus, the present inventors executed the evaluation of the visibility of non-uniformity in stripe. Next, evaluation of the visibility of non-uniformity in stripe executed by the present inventors will be explained.

Figure 8A:
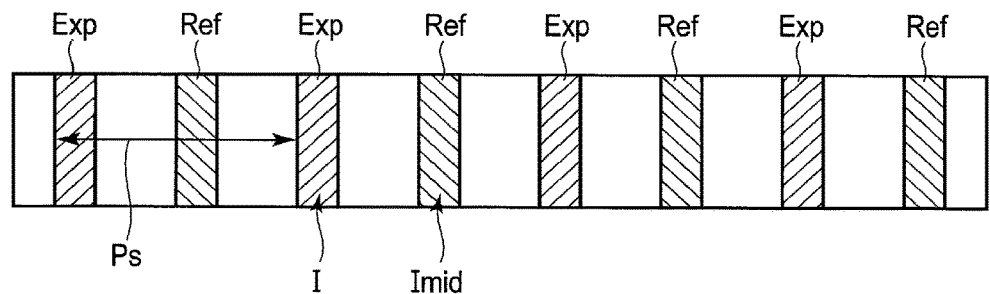
FIG. 8A is a schematic illustration showing a method of evaluating visibility of non-uniformity in stripe.

FIG. 8A is a schematic illustration showing a method of evaluating the visibility of non-uniformity in stripe.

In an evaluating and testing machine, reference areas Ref and test areas Exp were arranged alternately. In addition, the test areas Exp were spaced apart from each other at an interval of pitch Ps. The reference areas Ref and the test areas Exp were the areas where the green color having higher luminosity was displayed in strip shape, and the color is displayed by halftone Imid (127 gradations) in the reference areas Ref and is displayed as gradation I in the test areas Exp. Areas between the reference areas Ref and the test areas Exp were black display (0 gradation). The pitch Ps corresponds to the distance d10 shown in FIG. 7. A gamma value of the testing machine was 2.2.

It was evaluated whether the difference in luminance between the reference areas Ref and the test areas Exp was visibly recognized as stripes or not, by using the pitch Ps and the gradation I as variables, under the above conditions.

Figure 8B:
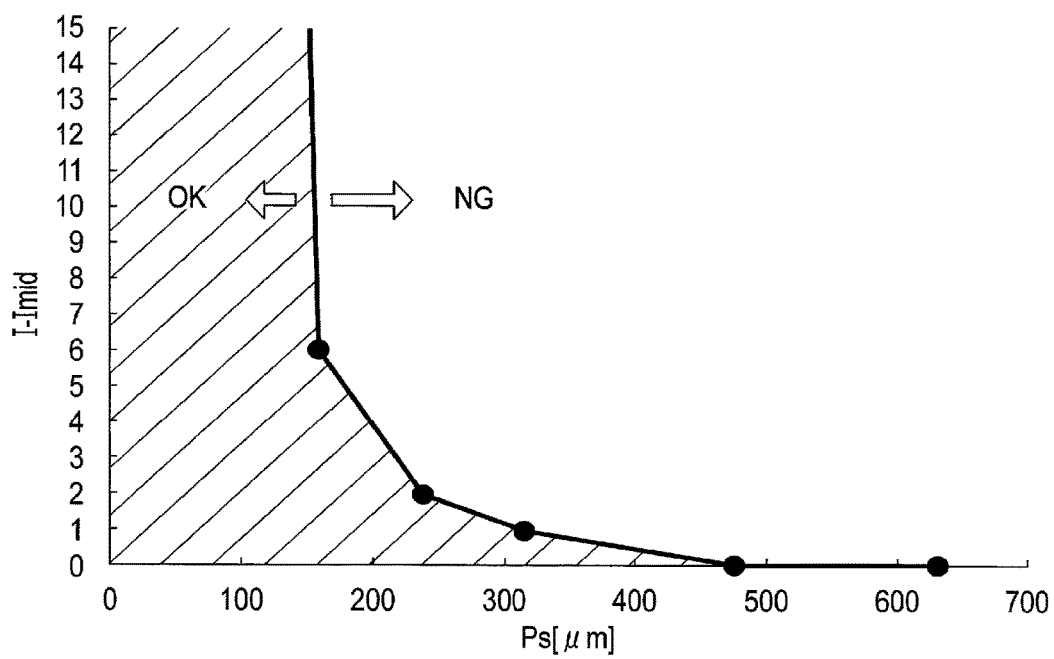
FIG. 8B is a graph showing evaluation results of the visibility of non-uniformity in stripe.

FIG. 8B is a graph showing evaluation results of the visibility of non-uniformity in stripe.

The longitudinal axis indicates gradation difference I−Imid between the reference areas Ref and the test areas Exp, and the lateral axis indicates the pitch Ps. NG indicates a condition range in which the stripes were visibly recognized, and OK indicates a condition range in which the stripes were not visibly recognized.

As a whole, the test areas Exp can easily be recognized as the pitch Ps is larger and can hardly be recognized as the pitch Ps is smaller. For example, when the pitch Ps was 310 µm, the test areas Exp were recognized as stripes although the gradation difference I−Imid was 1. When the pitch Ps was more than 160 µm and 250 µm or less, the test areas Exp were not recognized as stripes as the gradation difference I−Imid was sufficiently small but recognized as stripes as the gradation difference I−Imid was large. When the pitch Ps was 160 µm or less, the test areas Exp were not recognized as stripes as the gradation difference I−Imid was at least in a range of 6 or less. For example, the test areas Exp in which the pitch Ps is 160 µm are visibly recognized when the luminance of the test areas Exp is larger than 110% of the luminance of the reference areas Ref, from the viewpoint of the luminance ratio. In the present configuration example, the difference in luminance between the sub-pixel SPX adjacent to the boundary portions BR1 and BR7 and the sub-pixel SPX adjacent to the boundary portion BR4 is in a range of 10% or less to the luminance of the sub-pixel SPX adjacent to the boundary portion BR4, and is sufficiently smaller than 10%. For this reason, the non-uniformity in stripe can be suppressed and the degradation in display quality can also be suppressed if the pitch Ps is 160 µm or less. In addition, since the sub-pixels SPX corresponding to the test areas Exp or the reference areas Ref are the red pixels or blue pixels having lower luminosity than the green pixels, in the present configuration example, the display device 1 can suppress the non-uniformity in stripe even if the pitch Ps is in a range of more than 160 µm and 250 µm or less. Since the width of the main pixel PX in the first direction X is approximately 20 µm, the pitch Ps is 40 µm or more if the high-definition display device is assumed.

From the above, the distance d10 between the boundary portion BR1 (first boundary portion) and the boundary portion BR7 (third boundary portion) is, desirably, 40 µm or more and 250 µm or less and, more desirably, 40 µm or more and 160 µm or less.

Next, a second configuration example of the embodiments will be explained.

Figure 9:
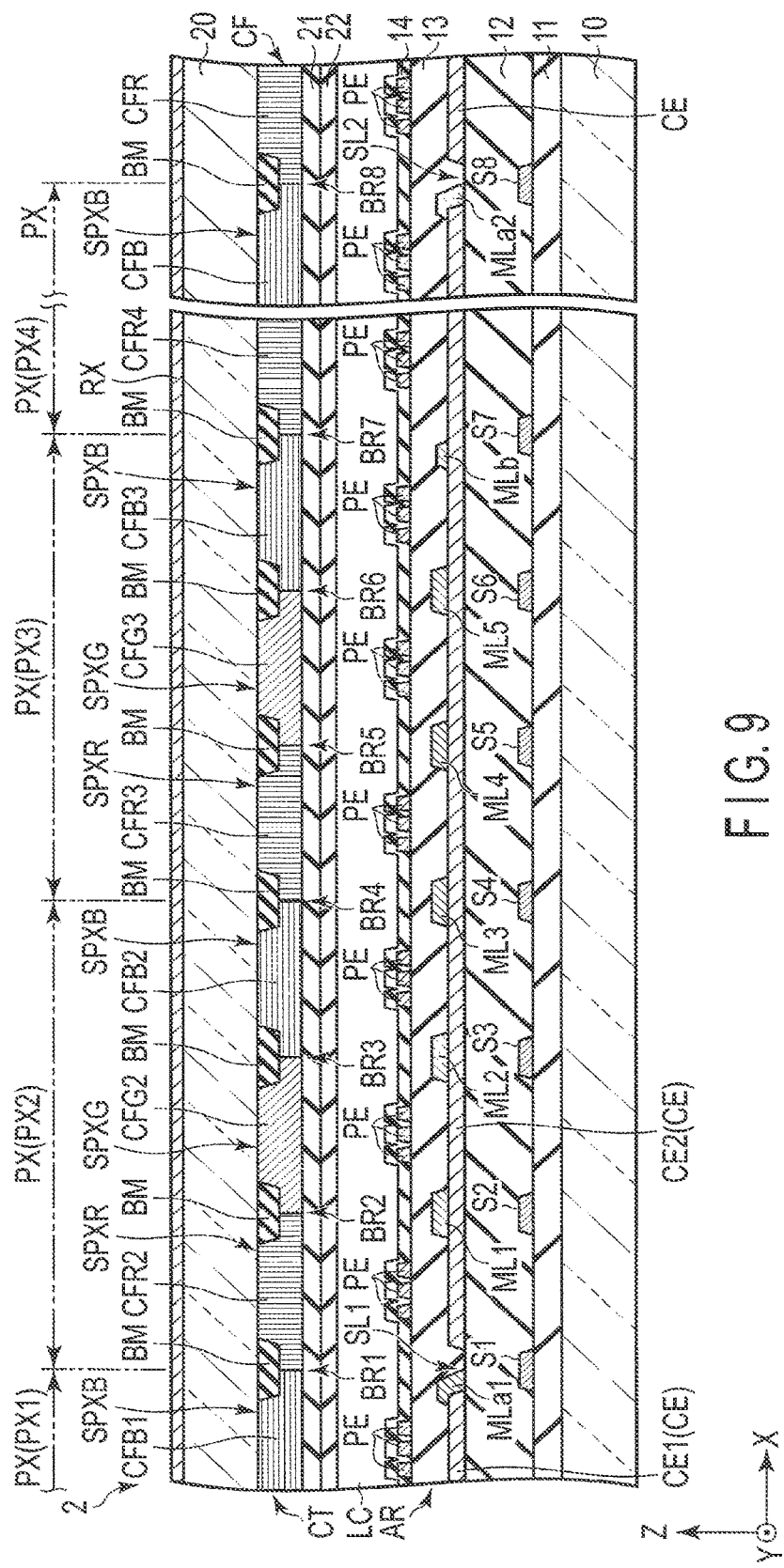
FIG. 9 is a cross-sectional view schematically showing a display panel 2 in a second configuration example.

FIG. 9 is a cross-sectional view schematically showing the display panel 2 in the second configuration example.

The second configuration example shown in this figure is different from the first configuration example shown in FIG. 6 with respect to a feature of comprising metal lines MLa (MLa1 and MLa2) and a metal line MLb.

The metal line MLa1 is disposed along the boundary portion BR1, opposed to a part of a video signal line S1 and occupies a part of the inside of the slit SL1. At the position corresponding to the boundary portion BR1, the second insulating layer 12 is in contact with the metal line MLa1 and is also in contact with the third insulating layer 13. In the example illustrated, the metal line MLa1 is in contact with the common electrode CE1 and spaced apart from the common electrode 2. The metal line MLa2 is disposed along the boundary portion BR8, opposed to a part of a video signal line S8 and occupies a part of the inside of the slit SL2. At a position corresponding to the boundary portion BR8, the second insulating layer 12 is in contact with the metal line MLa2 and is also in contact with the third insulating layer 13. In the example illustrated, the metal line MLa2 is in contact with the common electrode CE2. The metal line MLb is disposed along the boundary portion BR7 and opposed to a part of a video signal line S7. At a position corresponding to the boundary portion BR7, the common electrode CE2 is in contact with both the second insulating layer 12 and the third insulating layer 13 and is also in contact with the metal line MLb.

In the example illustrated, centers of the metal lines MLa1, MLa2, and MLb are displaced from centers of the video signal lines S1, S7, and S8, in the same direction, respectively. The width of the metal lines MLa1, MLa2, and MLb in the first direction X is different from the width of the metal lines ML in the first direction X. Next, the dimensions and positional relationship among the metal lines MLa1, MLa2, and MLb will be explained with reference to a plan view.

Figure 10:
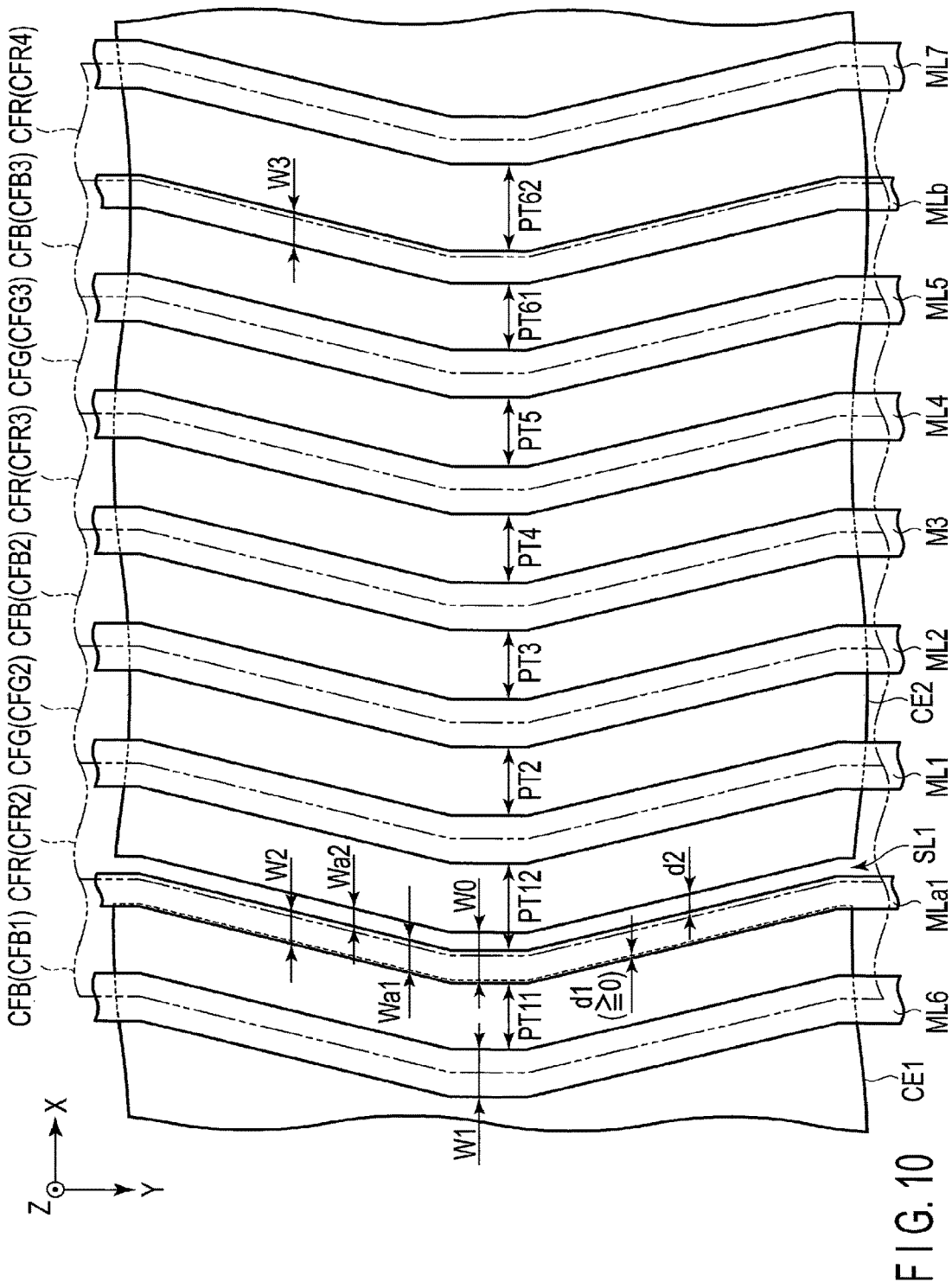
FIG. 10 is a plan view for explanation of various dimensions concerning the metal lines ML, MLa and MLb in the second configuration example.

FIG. 10 is a plan view for explanation of various dimensions concerning the metal lines ML, MLa and MLb in the second configuration example.

A width W2 of the metal line MLa1 is restricted for necessity to prevent short circuit of the adjacent common electrodes CE1 and CE2. In contrast, the width W1 of the metal lines ML superposed on the common electrode CE2 can be larger since such short circuit does not need to be considered. Thus, the width W2 may be smaller than the width W1. In addition, the width of the metal line MLb is W3 smaller than the width W1, and the width W3 is equal to the width W2 in the example illustrated (W1>W2=W3).

The width of the metal line MLa1 superposed on the slit SL1 in planar view is Wa1. In contrast, the width of the slit SL1 which is not superposed on the metal line MLa1 in planar view is Wa2 smaller than the width Wa1 (Wa1>Wa2). In other words, the metal line MLa1 covers more than a half of an area of the slit SL1 in the example illustrated.

A distance between the metal line MLa1 and the common electrode CE1 is d1. A distance between the metal line MLa1 and the common electrode CE2 is d2, which is longer than the distance d1 (d1<d2). In the present configuration example, d1 is greater than zero since the metal line MLa1 covers of the edge portion of the common electrode CE1. In the example illustrated, the metal line MLa1 is spaced apart from the edge portion of the common electrode CE1 in the distance d1, and from the edge portion of the common electrode CE2 in the distance d2 longer than the distance d1. The metal line MLa1 may be in contact with the edge portion of the common electrode CE1. In this case, d1 is zero. The metal line MLa may be superposed on the common electrode CE1 and may not be superposed on the common electrode 2, in planar view. In this case, the metal line MLa has a width enough to be superposed from the slit SL1 to the common electrode CE1 in the first direction X.

In the example illustrated, an interval between the metal lines ML6 and MLa1 is PT11 smaller than any one of the intervals PT2 to PT5. In addition, an interval between the metal lines MLa1 and ML1 is PT12, which is greater than any one of the intervals PT2 to PT5 and greater than the interval PT11. Similarly, an interval between the metal lines ML5 and MLb is PT61 smaller than any one of the intervals PT2 to PT5. In addition, an interval between the metal lines MLb and ML7 is PT62, which is greater than any one of the intervals PT2 to PT5 and greater than the interval PT61. The interval PT61 is equal to the interval PT11, and the interval PT62 is equal to the interval PT12. However, the intervals PT11, PT12, PT61, and PT62 may be equal to each other and may be equal to the intervals PT2 to PT5.

According to the present configuration example, the same advantages as those of the above-first configuration example can be obtained. Furthermore, since the metal lines MLa and MLb function as the light-shielding layer, occurrence of color shift and color mixture can be further reduced.

Figure 11:
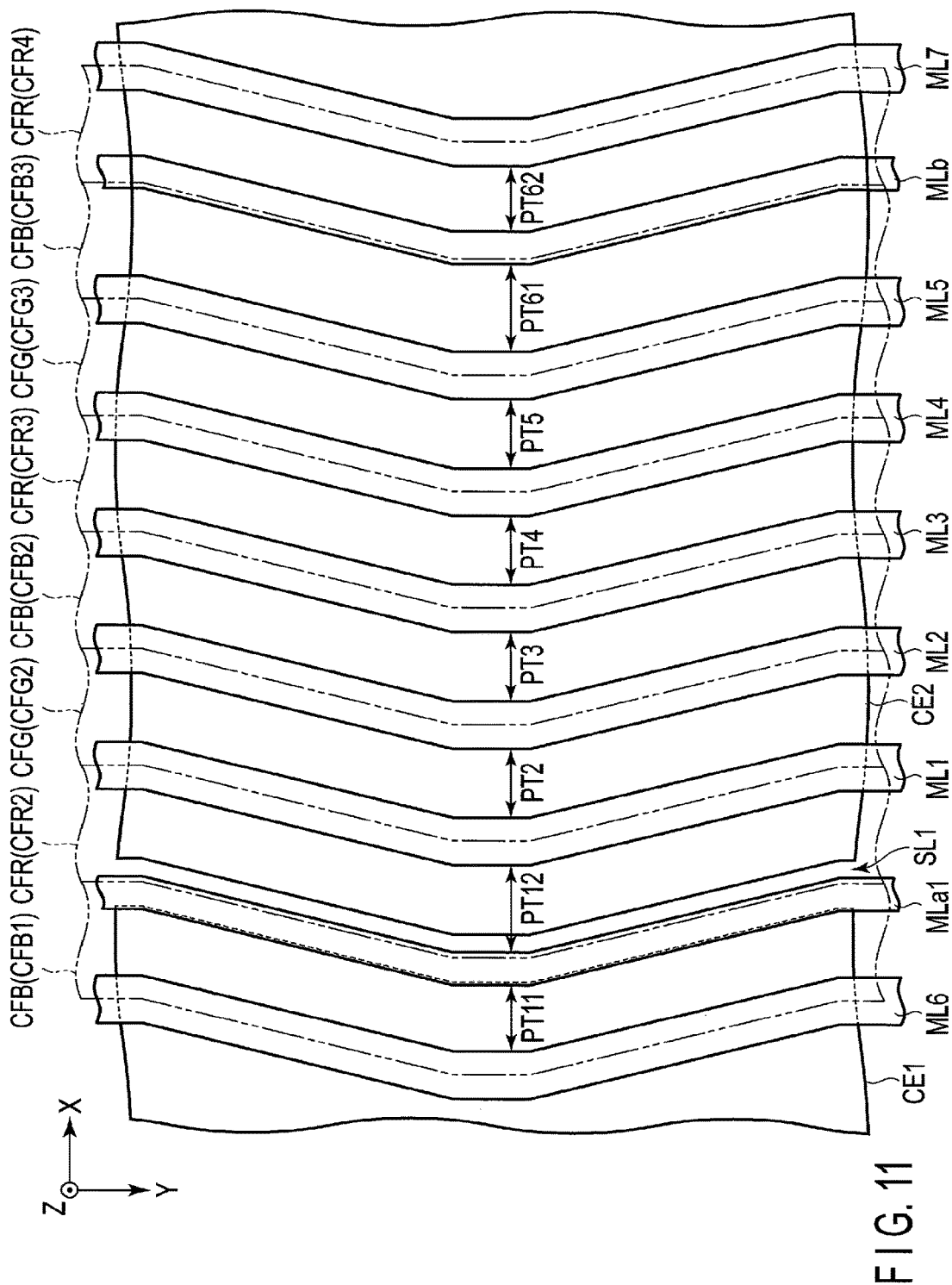
FIG. 11 is a plan view for explanation of a positional relationship among the metal lines ML, MLa and MLb in a first modified example of the second configuration example.

FIG. 11 is a plan view for explanation of a positional relationship among the metal lines ML, MLa and MLb in a first modified example of the second configuration example.

The illustrated configuration example is different from the configuration example shown in FIG. 10 with respect to a feature that the metal line MLb is displaced from the metal line MLa1 in the opposite direction. The center of the metal line MLb is displaced from a center of the video signal line S7 (not shown) to the side on which an arrow of the first direction X is located. For example, the interval PT61 is larger than the interval PT62. In addition, the interval PT61 is equal to the interval PT12, and the interval PT62 is equal to the interval PT11.

According to the present modified example, the same advantages as those of the above-explained second configuration example can be obtained. In addition, since the metal line MLa1 has a larger area for superposing on the color filter CFB1 than that on the color filter CFR2, color mixture in the sub-pixel SPXB can be reduced more strongly than that in the sub-pixel SPXR and the dependency of the aperture ratio on the viewing angle in the sub-pixel SPXR can be suppressed. Since the metal line MLb has a larger area for superposing on the color filter CFB3 than that on the color filter CFR4, color mixture in the sub-pixel SPXR can be reduced more strongly than that in the sub-pixel SPXB and the dependency of the aperture ratio on the viewing angle in the sub-pixel SPXB can be suppressed. Therefore, the metal lines MLa1 and MLb can cancel color mixture and color shift and suppress the degradation in display quality.

FIG. 12 is a plan view for explanation of a positional relationship among the metal lines ML, MLa and MLb in a second modified example of the second configuration example.

The illustrated configuration example is different from the configuration example shown in FIG. 10 with respect to features that the metal line MLa1 is composed of partial lines MLa11 and MLa12 spaced apart in the second direction Y and that the metal line MLb is composed of partial lines MLb1 and MLb2 spaced apart in the second direction Y.

The partial line MLa11 is in contact with the common electrode CE1 and spaced apart from the common electrode CE2. Oppositely, the partial line MLa12 is spaced apart from the common electrode CE1 and is in contact with the common electrode CE2. In other words, a center of the partial line MLa11 is displaced from the center of the video signal line S1 (not shown) to the direction opposite to the side on which an arrow of the first direction X is located, and a center of the partial line MLa12 is displaced from the center of the video signal line S1 (not shown) to the direction in which the arrow of the first direction X is located. In other words, the area of the partial line MLa11 superposed on the color filter CFB1 is larger than the area of the partial line MLa11 superposed on the color filter CFR2. In addition, the area of the partial line MLa12 superposed on the color filter CFB1 is smaller than the area of the partial line MLa12 superposed on the color filter CFR2.

The partial line MLb1 is arranged with the partial line MLa11 in the first direction X, and the partial line MLb2 is arranged with the partial line MLa12 in the first direction X. The partial line MLb1 is displaced from the partial line MLa11 in the opposite direction, and the partial line MLb2 is displaced from the partial line MLa12 in the opposite direction. In other words, a center of the metal line MLb1 is displaced from the center of the video signal line S7 (not shown) to the direction in which the arrow of the first direction X is located. Oppositely, a center of the metal line MLb2 is displaced from the center of the video signal line S7 (not shown) to the direction in which the arrow of the first direction X is located. In other words, the area of the partial line MLb1 superposed on the color filter CFB3 is smaller than the area of the partial line MLb1 superposed on the color filter CFR4. In addition, the area of the partial line MLb superposed on the color filter CFB3 is larger than the area of the partial line MLb2 superposed on the color filter CFR4.

For example, the interval PT11 between the metal line ML6 and the partial line MLa11 is smaller than the interval PT12 between the partial line MLa11 and the metal line ML1. The interval PT13 between the metal line ML6 and the partial line MLa12 is larger than the interval PT14 between the partial line MLa12 and the metal line ML1.

According to the present modified example, the same advantages as those explained above can be obtained. In addition, the partial lines MLa11 and MLa12 can cancel color mixture and color shift. The partial lines MLb1 and MLb2 can also cancel color mixture and color shift.

Next, an arrangement example of the spacer SP will be explained with reference to an enlarged view showing the vicinity to the metal line ML3. The next explained arrangement example of the spacer SP is applicable to any one of the configuration examples of the embodiments.

FIG. 13 is a plan view showing an example of a positional relationship between the metal lines ML and the spacer SP.

The spacer SP protrudes from one of the array substrate AR and the counter-substrate CT toward the other substrate. The spacer SP may protrude from the array substrate AR or protrude from the counter-substrate CT. The spacer SP forms a cell gap between the first alignment film 14 and the second alignment film 22. The position of formation of the spacer SP is, for example, a position superposed on the scanning signal line G and the light-shielding layer BM in planar view. In the figure, the dotted line represents a grounding area of the spacer SP on the substrate on the side on which the metal line ML is disposed, of two opposed substrates (AR and CT).

The metal line ML3 is composed of the partial lines ML31 and ML32. The partial lines ML31 and ML32 are arranged along a boundary portion BR4 and remote from each other in the second direction Y. The partial line ML31 extends in the direction D2 and the partial line ML32 extends in the direction D1. The spacer SP is disposed along a boundary portion BR4 and located between the partial lines ML31 and ML32. A grounding area of the spacer SP is remote from the partial lines ML31 and ML32 in planar view. A width of the spacer SP in the first direction X larger than a width of the metal line ML3 in the first direction X.

According to the present arrangement example, since the metal line ML is not formed in the grounding area of the spacer SP, occurrence of variation in the cell gap in accordance with the thickness of the metal line ML can be suppressed in response to the presence of the metal line ML.

The generation of air bubble due to shortage of a liquid crystal amount in the liquid crystal layer LC and the non-uniformity in display which results from the difference in thickness of the liquid crystal layer LC can be thereby suppressed.

Next, sensing drive of the sensor device which detects approach or contact of the object in the display device 1 will be explained. The sensor device explained here is what is called a mutual-capacitive sensing type sensor device. The mutual-capacitive sensing type sensor device detects the object, based on the variation in inter-electrode capacitance between the drive electrode TX and the detection electrode RX.

FIG. 14 is an illustration for explanation of a principle of a mutual-capacitive sensing method.

A finger Fg serving as a conductive object is assumed to input to the display device 1.

The sensor driving electrodes TX and the detection electrodes RX are subjected to electrostatic capacitive coupling, and inter-electrode capacitance Cc is formed between the sensor driving electrodes TX and the detection electrodes RX. The finger Fg approaches the detection electrodes RX from a side of the detection electrodes RX which is opposed to the sensor driving electrodes TX. A position of the finger Fg in the X-Y plane is assumed to be position DP. At the position DP, coupling capacitance Cx is formed between the finger Fg and the detection electrode RX.

In the sensing, first, a pulse-shaped sensor driving signal Vw is written to the sensor driving electrode TX, and a sensor signal is generated in accordance with the variation in the inter-electrode capacitance Cc between the sensor driving electrode TX and the detection electrode RX. Next, the touch detector IC chip 4 reads a pulse-shaped detection signal Vr indicating the variation of the sensor signal from the detection electrode RX. The position of the finger Fg can be detected, based on the timing of supplying the sensor drive signal Vw to the sensor driving electrode TX and on the detection signal Vr from the detection electrode RX.

The display drive and the sensing drive in the display device 1 are executed within, for example, one frame period. For example, one frame period is divided into a first period to display an image and a second period to detect the object. During the first period, the display drive of writing the video signals to all the main pixels PX of the display area DA is executed in time division (display period). During the second period following the first period, the sensing drive of detecting the object in the entire display area DA is executed in time division (detection period or sensing period). The sensor driving electrode TX is supplied with the common drive signal during the first period and with the sensor drive signal during the second period.

The mutual-capacitive sensing has been explained but the sensor device may have a configuration capable of self-capacitive sensing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device, comprising:
first, second, and third color filters arranged in a first direction and spaced apart from each other;
a fourth color filter adjacent to the first color filter in the first direction;
a fifth color filter adjacent to the second color filter in the first direction;
a sixth color filter adjacent to the third color filter in the first direction;
a first boundary portion between the first color filter and the fourth color filter;
a second boundary portion between the second color filter and the fifth color filter;
a third boundary portion between the third color filter and the sixth color filter;
a first insulating layer opposed to the first to sixth color filters;
a first common electrode located on a side of the first insulating layer opposed to the first color filter;
a first slit extending along the first boundary portion;
a second common electrode located on a side of the first insulating layer opposed to the second to sixth color filters, and being adjacent to the first common electrode via the first slit;
a second insulating layer located on a side of the first to second common electrodes opposed to the first to sixth color filters; and
a first metal line disposed along the second boundary portion and being in contact with the second common electrode,
wherein
the first insulating layer is in contact with the second insulating layer at a position corresponding to the first boundary portion,
the second common electrode is in contact with any one of the first and second insulating layers at a position corresponding to the second boundary portion, and
the second common electrode is in contact with both the first and second insulating layers at a position corresponding to the third boundary portion.

2. The display device of claim 1, further comprising:
a second metal line disposed along an edge portion of the first color filter;
a third metal line disposed along an edge portion of the fourth color filter and being adjacent to the second metal line at a first interval;
a fourth metal line disposed along an edge portion of the second color filter and being adjacent to the first metal line at a second interval smaller than the first interval;
a fifth metal line disposed along an edge portion of the fifth color filter and being adjacent to the first metal line at a third interval smaller than the first interval;
a sixth metal line disposed along an edge portion of the third color filter; and
a seventh metal line disposed along an edge portion of the sixth color filter and being adjacent to the sixth metal line at a fourth interval equal to the first interval.

3. The display device of claim 1, further comprising:
a second metal line disposed along the first boundary portion, being in contact with the first common electrode, and spaced apart from the second common electrode;
a third metal line disposed along the third boundary portion;
a fourth metal line disposed along an edge portion of the third color filter and being adjacent to the third metal line at a first interval; and a fifth metal line disposed along an edge portion of the sixth color filter and being adjacent to the third metal line at a second interval different from the first interval.

4. The display device of claim 3, wherein
the second interval is larger than the first interval.

5. The display device of claim 3, wherein
the second interval is smaller than the first interval.

6. The display device of claim 1, wherein
the first to third color filters are color filters of a first color, and
the fourth to sixth color filters are color filters of a second color different from the first color.

7. The display device of claim 1, wherein
the second common electrode is adjacent to a second slit on a side opposite to the first slit,
the first color filter and the second color filter are color filters of a first color,
the fourth color filter and the fifth color filter are color filters of a second color different from the first color, and
an interval between the first slit and the second slit in the first direction is an integer multiple of an interval between the first boundary portion and the third boundary portion in the first direction.

8. The display device of claim 6, wherein
the first color is blue and the second color is red.

9. The display device of claim 1, wherein
a distance between the first boundary portion and the third boundary portion is 40 µm or more and 160 µm or less.

10. The display device of claim 1, further comprising:
a first substrate including the first insulating layer, the second insulating layer, the first common electrode, the second common electrode, the first insulating layer, and the second insulating layer;
a second substrate opposed to the first substrate; and;
a spacer located between the first substrate and the second substrate,
wherein
the first metal line includes a first line and a second line spaced apart from the first line in a second direction intersecting the first direction in planar view, and
the spacer is superposed on the second boundary portion and located between the first line and the second line.

11. The display device of claim 1, wherein
the display device does not comprise a metal line which is in contact with the first common electrode and the second common electrode along the first boundary portion, and a metal line different from the metal line which is in contact with the second common electrode along the third boundary portion.

12. The display device of claim 2, further comprising:
an eighth metal line superposed on the first common electrode and the first slit at a position between the second metal line and the third metal line, and not superposed on the second common electrode, in planar view.

13. The display device of claim 12, further comprising:
a ninth metal line located between the sixth metal line and the seventh metal line, in planar view,
wherein
the ninth metal line is spaced apart from the sixth metal line at a fifth interval, and spaced apart from the seventh metal line at a sixth interval different from the fifth interval.

14. The display device of claim 13, wherein
the second metal line, the third metal line, the fourth metal line, the fifth metal line, the sixth metal line, and the seventh metal line are disposed in order in the first direction, in planar view,
the fifth interval is equal to an interval between the second metal line and the eighth metal line, and
the sixth interval is equal to an interval between the third metal line and the eighth metal line.

15. The display device of claim 13, wherein
the second metal line, the third metal line, the fourth metal line, the fifth metal line, the sixth metal line, and the seventh metal line are disposed in order in the first direction, in planar view,
the fifth interval is equal to an interval between the third metal line and the eighth metal line, and
the sixth interval is equal to an interval between the second metal line and the eighth metal line.

16. The display device of claim 2, further comprising, in planar view:
a first partial line superposed on the first common electrode and the first slit at a position between the second metal line and the third metal line and not superposed on the second common electrode; and
a second partial line spaced apart from the first partial line in a second direction intersecting the first direction, superposed on the second common electrode and the first slit, and not superposed on the first common electrode.

17. The display device of claim 16, wherein
the first partial line is in contact with the first common electrode, and
the second partial line is in contact with the second common electrode.

18. The display device of claim 17, further comprising, in planar view:
a third partial line located between the sixth metal line and the seventh metal line; and
a fourth partial line spaced apart from the third partial line in the second direction intersecting the first direction and located between the sixth metal line and the seventh metal line,
wherein
the third partial line is spaced apart from the sixth metal line at a fifth interval and spaced apart from the seventh metal line at a sixth interval different from the fifth interval, and
the fourth partial line is spaced apart from the sixth metal line at a seventh interval and spaced apart from the seventh metal line at an eighth interval different from the seventh interval.

19. The display device of claim 18, wherein
the second metal line, the third metal line, the fourth metal line, the fifth metal line, the sixth metal line, and the seventh metal line are disposed in order in the first direction, in planar view,
the fifth interval is equal to an interval between the third metal line and the first partial line,
the sixth interval is equal to an interval between the second metal line and the first partial line,
the seventh interval is equal to an interval between the third metal line and the second partial line, and
the eighth interval is equal to an interval between the second metal line and the second partial line.

20. The display device of claim 16, wherein the first to third color filters are blue color filters, and the fourth to sixth color filters are red color filters.

* * * * *